United States Patent [19]
Jager et al.

[11] Patent Number: 5,790,288
[45] Date of Patent: Aug. 4, 1998

[54] TRANSPORT NETWORK WITH HIGH TRANSMISSION CAPACITY FOR TELECOMMUNICATIONS

[75] Inventors: Hubert Anton Jager, Wangen, Germany; Ming Seng Kao, Hsinchu, Taiwan

[73] Assignee: Nokia Telecommunications Oy, Espoo, Finland

[21] Appl. No.: 727,556

[22] PCT Filed: Apr. 7, 1995

[86] PCT No.: PCT/EP95/01284

§ 371 Date: Dec. 10, 1996

§ 102(e) Date: Dec. 10, 1996

[87] PCT Pub. No.: WO95/28815

PCT Pub. Date: Oct. 26, 1995

[30] Foreign Application Priority Data

Apr. 15, 1994 [DE] Germany ............... 44 12 920.3
Sep. 23, 1994 [DE] Germany ............... 44 33 960.7

[51] Int. Cl.⁶ .................... H04J 4/00; H04J 14/00
[52] U.S. Cl. ............... 359/123; 359/125; 359/137; 385/17
[58] Field of Search ............... 359/109, 123–125, 359/127–128, 137, 165, 115; 385/17; 370/406

[56] References Cited

U.S. PATENT DOCUMENTS

| | | | |
|---|---|---|---|
| 5,128,789 | 7/1992 | Abramovitz | 359/118 |
| 5,465,379 | 11/1995 | Li et al. | 359/127 |
| 5,530,575 | 6/1996 | Acampora et al. | 359/128 |

*Primary Examiner*—Kinfe-Michael Negash
*Attorney, Agent, or Firm*—Antonelli, Terry, Stout & Kraus, LLP

[57] ABSTRACT

A transport network with a transmission capacity for telecommunications in which nodes of the network are transparently connected with one another by optical glass fiber lines functionally to produce a full intermeshing of nodes permitting simultaneous addressing of all the nodes by every other node of the network. The nodes are coupled with one another in a matrix configuration in lines and columns. Each of corner nodes has at least n connections in the column direction and at least m connections in the line direction. Intermediate nodes (1.2 to 1.(m−1); n.2 to n.(m−1)) that are located in marginal lines, in a direction of the columns, have n connections and in a direction of the lines have 2·m connections. The intermediate nodes (2.1 to (n−1).1 and 2.m to (n−1).m)) located in marginal columns, in a line direction, have m connections and, in a column direction, have 2·n connections. Inner nodes of the network are connected with each of four neighbors by a total of 2·m connections, in the line direction, and 2·n connections, in the column direction. Individual nodes are addressable by at least one line and/or one column.

19 Claims, 13 Drawing Sheets

| | | | | |
|---|---|---|---|---|
| II | III | IV | V | I |
| III | IV | V | I | II |
| IV | V | Tx | II | III |
| V | I | II | III | IV |
| I | II | III | IV | V |

1100

TRANSPORT NETWORK WITH HIGH TRANSMISSION CAPACITY FOR TELECOMMUNICATIONS

BACKGROUND OF THE INVENTION

1. Field of the Invention

The invention relates to a transport network with a high transmission capacity for telecommunications, in which nodes of the network are transparently linked with one another by optical glass fiber lines in such fashion that a complete functional intermeshing of the nodes is produced that permits simultaneous addressing of every node by every other node in the network.

2. Description of the Prior Art

Such a network is known in the form of a fully intermeshed wavelength-multiplex network with a Star topology (H. Kobrinski, "Crossconnection of Wavelength-Division-Multiplexed High Speed Channels," IEE Electrical Letters, Volume 23, pp. 975–977, Aug. 27, 1987).

In this known network, every node can be addressed by every other node through a central node. The disadvantages of this network configuration are the following: in the event of failure of one of the transmission lines between the individual nodes and the central node, communication with other network nodes is completely interrupted for this node. Data streams from other network nodes cannot be received by this node, nor can data streams be transmitted to other network nodes. In the event of failure of the central node, no communication whatever is possible any longer between individual network nodes. In addition, a serious disproportion can exist between the Euclidean intervals of a node and the nodes adjacent to this node and the transmission line lengths along the optical fiber link through the central node to these nodes.

The goal of the invention is therefore to improve a functionally completely intermeshed telecommunications network of the species recited at the outset in such fashion that its sensitivity to the failure of individual nodes is significantly reduced and the drastic disproportions between the Euclidean distance and the fiber-optic transmission lines become much more favorable.

The network configuration of the invention achieves at least the following functional properties and advantages:

The network configuration according to the invention in matrix topology links every node in the network with at least its two neighbors and thus, in the event of failure of one of the glass fiber cable links connecting the nodes, rerouting the data streams through the remaining connections. For static or approximately static and equally distributed increases in data traffic, full intermeshing provides the largest usable transmission capacity since no transmission capacity need then be provided for the functions of a protocol, to regulate the distribution of the entire transmission capacity of the network at the individual nodes. The functional full intermeshing of this network with matrix topology is achieved by using various optical fibers along a line to address the column of an addressed node and a signal identifier for addressing the line of the same addressed node, the use of a number of transmitters and receivers that corresponds to the number of network nodes, and a permutation of the signal identifiers used for addressing along the lines and columns to avoid collisions. Due to the fact that the signal path of a data stream runs only along the line of the transmitting node and along the column of the receiving node, in a network with regular matrix-type nodes the ratio between the length of the fiber optic transmission line and the Euclidean distance between transmitting and receiving nodes is less than or equal to the square root of 2.

An addressing space is used that consists exclusively of a number of differently defined wavelengths that corresponds to the number of network nodes. This offers the advantage that a modulation format can be freely chosen for each of the transmission paths in the network that are specified only in the wavelength.

An addressing space is used that consists exclusively of a number of differently defined periodic time slots that corresponds to the number of network nodes at which the corresponding transmitter and receiver are ready to receive. Operation can proceed with only one wavelength, but it requires synchronization of the transmitters and time-multiplexers of the individual network nodes with one another.

An addressing space is used that consists of various wavelengths as well as time windows or time slots that recur in a periodic sequence. This offers the advantage that for a number of network nodes that is too large to use a corresponding number of wavelengths that are different by definition, a sufficiently large addressing space can nevertheless be formed.

The advantage of the matrix-type structure for linking the network nodes with one another, permits a "detour" of data streams in both the optical and electrical ranges in the event of failure of parts of the network.

Protection paths occur in the electrical area and through a plurality of network lines that are not affected by damage and the advantage is obtained of having a control of the protection paths that is both simple and flexible.

The network nodes have a uniform structure of wavelength multiplexers and wavelength demultiplexers and a programmable structure composed of waveguides, optical transmitters and receivers, these node structures are suitable for electro-optical integration.

Use of optical semiconductor amplifiers (SOA) in the waveguide included in the node structure, makes use of the fact that only light fluxes of one wavelength propagate along these waveguides. The simultaneous amplification of only one wavelength at a time is necessary since strong saturation-induced crosstalk in the optical semiconductor amplifier does not permit any other type of operation. However, as it is the case here, when light fluxes of only one wavelength propagate along the waveguide, advantage can be taken of the optical semiconductor amplifier that permits regenerative pulse shaping of the modulation pulses propagating along dispersive fibers.

Use of a combination of wavelengths and time slots to form the address space signify that the data streams of one line coming from different columns and transmitted by different wavelengths can be brought together only by power dividing elements and the advantage is obtained that the transmitting and receiving elements of the various nodes do not have to be synchronized with one another.

The goal stated initially and forming the basis of the invention is that each of the corner nodes (1,1; 1,m; n,1 and n,m), looking in the column direction, has at least 2·(n−1) connections and in the line direction has at least 2·(m−1) connections, and the intermediate nodes (1,2; ...;1,j;...;1,(m−1) and n,2;...;nj;...;n,(m−1) with j=(2,3;...; m−1)) located in the marginal lines, looking in the column direction, have at least 2·(m−j)·j+2·(m−j+1)·(j−1) connections and the intermediate nodes located in the marginal columns (2,1; ... ; i,1; ... ;(n−1),1 and 2,m; ... ;1,j; ... ;(n−1),m) with i=(2;3; ... ; n−1)), looking in the line direction, have at least 2·(m−1) connections and, looking in the column direction, has at least 2·(n−i)·i+2·(n−i+1)·(i−1) connections and the inner nodes (i,j with i=(2;3; ... ;n−1) and j=(2;3; ... ;m−1)) of network (10) are connected with each of their four neighbors by a total of at least 2·(m−j)·j+2·(m−j+1)·(j−1) connections, looking in the line direction, and with at least 2·(n−i)·i+2·(n−i+1)·(i−1) connections, looking in the column direction. Because the number of glass fibers along the lines and columns between two nodes of the network is proportional to the sum of the channels required for functional full intermeshing, the capacity utilization of all the fibers is maximized by a load that is evenly distributed through the fibers.

An addressing space is provided that consists of a number of wavelengths that are different by definition and that corresponds to the larger of the number of nodes of a line m and the number of nodes of a column n. This has the advantage that for each of the transmission paths in the network, specified only by wavelength, a modulation format can be freely chosen, yet only a number of wavelengths smaller than the number of nodes in the network is required. For the "quadratic" case (m=n), the number of wavelengths defined as different that are required corresponds only to the square root of the number of nodes. Another advantage is achieved by the fact that at each node in the network that can be addressed in this fashion, with the exception of the wavelength marked "T", each of the max(m,n) wavelengths defined as different is assigned to exactly m·n/max(m,n) transmitters as the emission wavelength and to exactly m·n/max(m,n) receivers as a receiving wavelength, with the possibility of using laser diodes and photo diode arrays that are preferably operable at max (m,n) wavelengths. The number of transmitters and receivers in each node associated with wavelength "T" is nearly m·n/max(m,n), namely (m·n/max(m,n))−1.

For each node in the network according to the invention, a structure that is identical for all the nodes is used, to which structure those fibers are connected that carry light fluxes that lead to the column of the node, as well as those fibers that support the light fluxes that are directed from this node to the other columns in the network. All other fibers are merely looped through. As a result of the uniformity of the node structure, the first advantage is obtained, namely that the nodes can be manufactured in large numbers and thereby can be provided economically, as well as the second advantage, namely that the structure is especially suitable for electro-optical integration. This structure, which is identical for all the nodes, includes the various wavelengths for distribution of the light fluxes that come from the line of a node to the fibers of the column of this node, has the necessary structure of a "WDM-Cross-Connects" mentioned at the outset. This structure of the "WDM-Cross-Connects" within all the nodes of the network according to the invention thus constitutes a basic structure whose expansion in the design of the network according to the invention can be referred to as "WDM-Gridconnect."

The encoding of the addressing in the wavelength of each node is identical when the rule is applied, first along the line and then along the column, for selecting the signal path and, when the rule is applied to select the signal path first along the column and then along the line, offers the advantage that the network according to the invention, without changing the node structure, can be switched to a state with modified signal paths only by switching the connections to the node structure used. As a result, it is possible to switch the already-mentioned spatially disjointed protecting paths for signals whose path has been interrupted by a failure, in the optical range for light fluxes, which change along the path from their transmitting nodes to their receiving nodes and change the column as well as the line of the network.

The network can be expanded by virtue of the fact that the nodes of columns j and j+1 are connected pairwise with one another with four additional fibers in the line direction, with, for even numbered m, index j=(1, 3, 5, 7, . . . , m−3, m−1) and j=(1, 3, 5, 7, . . . , m−4, m−2, m−1) for odd-numbered m, and the nodes of lines i and i+1 are connected together pairwise with four additional fibers in the column direction, where index i=(1, 3, 5, 7, . . . , n−3, n−1) is used for even-numbered n, and i=(1, 3, 5, 7, . . . , n−4, n−2, n−1) is used for odd-numbered n. This offers the advantage that the abovementioned protection paths for signals whose path used in normal operation has been interrupted by an accident, can be switched for all light fluxes of the network in the optical range. The additional fibers added form an arrangement of topologies in "comb form," the spatially disjunctive alterative protection paths to the paths that run only within lines or columns of the network. The fact that these "comb forms" are arranged in such fashion that the "comb arms" have the shortest possible length indicates that the ratio between the path length and Euclidean distance between two nodes of a line or column is minimal. Another advantage results from the complete utilization of the capacities freed up by the protection paths along the "comb back" of the protection paths and, through maximum utilization of the additional fibers with (m−1) and (n−1) light fluxes, defines various wavelengths for addressing (m−1) or (n−1) nodes of the same line or column. Time slots are assigned to the network in a periodic sequence, within which slots the network is alternately switched to one of two possible signal paths. This offers the advantage that for each of the signal paths of a network operated in such fashion, an alternative signal path exists within every other time slot that can be utilized optionally as a complete replacement only in the case of damage, or it can be used continuously. When the latter alterative is chosen, only a halving of the transmission capacity utilized can be expected in spatially delimited accidents.

Two networks are operated in parallel with different signal path selection possibilities, and have the advantage that, likewise optionally, a spatially disjunctive "mirror system" can be used as a complete replacement in the event of an accident or a doubled transmission capacity can be used that is "halved" once again in the event of an accident.

The network can be expanded in such fashion that nodes of the network are connectable by at least two additional optical fibers from nodes other than those of the network to at least one node. This has the advantage that a communications capability, in other words a bidirectional data transmission possibility, of the nodes in the network with the nodes of another network is achieved.

The network can be expanded by virtue of the wavelength multiplexer and wavelength demultiplexer in use being operable with a minimum of one wavelength more than is required for full intermeshing, with it being possible to provide additional optically transparent paths to achieve a communications capability for the nodes in the network with nodes of other networks of the same design, with these optical paths not having their respective transmitting and receiving points at the marginal nodes of the network alone. If the number of optical transparent paths for linking two networks is increased in this manner, the advantage is obtained that the number of transmitters and receivers on the partial paths that divide the transmission capacity of these wavelength paths and must be synchronized with one another, is reduced. In the event of maximum utilization of the transmission capacities, in the case of a full intermeshing of m×n nodes, with m=n, using only m wavelengths defined as different, the required condition is meet of increasing the addressing space in order to forecast a "penetration or intermeshing depth" of the transparent path that is greater than 1. "Penetration depth 1" is intended to mean that at least one of the peripheral nodes of the network can be reached. Penetration depth "N" is intended to mean reaching up to a minimum of one node of the N-th line or column, depending on the direction of penetration.

For all nodes (1, 1 to n, m) looking in both column and line directions, at least N·(N−1) connections are provided and the address of the line of each node is encoded into one of at least 2·N−1 wavelengths defined as different, and each node can be addressed using one of at least 2·N−1 wavelengths defined as different for the nodes of a line, where N is the larger of the two numbers n and m. Firstly, this has the advantage that the number of nodes intermeshed with one another can be expanded as desired. There is the additional advantage that a "penetration or intermeshing depth" of the optically transparent paths of N−1 columns and N−1 lines is always provided in the expanded as well as the expanding part of the network, and hence there is the further advantage that all the partial networks of N×N nodes are fully intermeshed with one another. In addition, the utilization of the transmission capacity of the fibers by the nodes that utilize the paths to N·N−1 other nodes is maximized. In the boundary case of the intermeshing of an infinite number of nodes, all of the transmission capacities provided are utilized.

BRIEF DESCRIPTION OF THE DRAWINGS

Further details of the invention will follow from the description below of special embodiments according to the drawings.

FIGS. 8a and 8b show an address table to explain the addressing of the nodes of the network according to FIG. 7;

FIG. 13 is an address table to explain the addressing of the nodes of the network according to FIG. 12.

DESCRIPTION OF THE PREFERRED EMBODIMENTS

Figure 1:
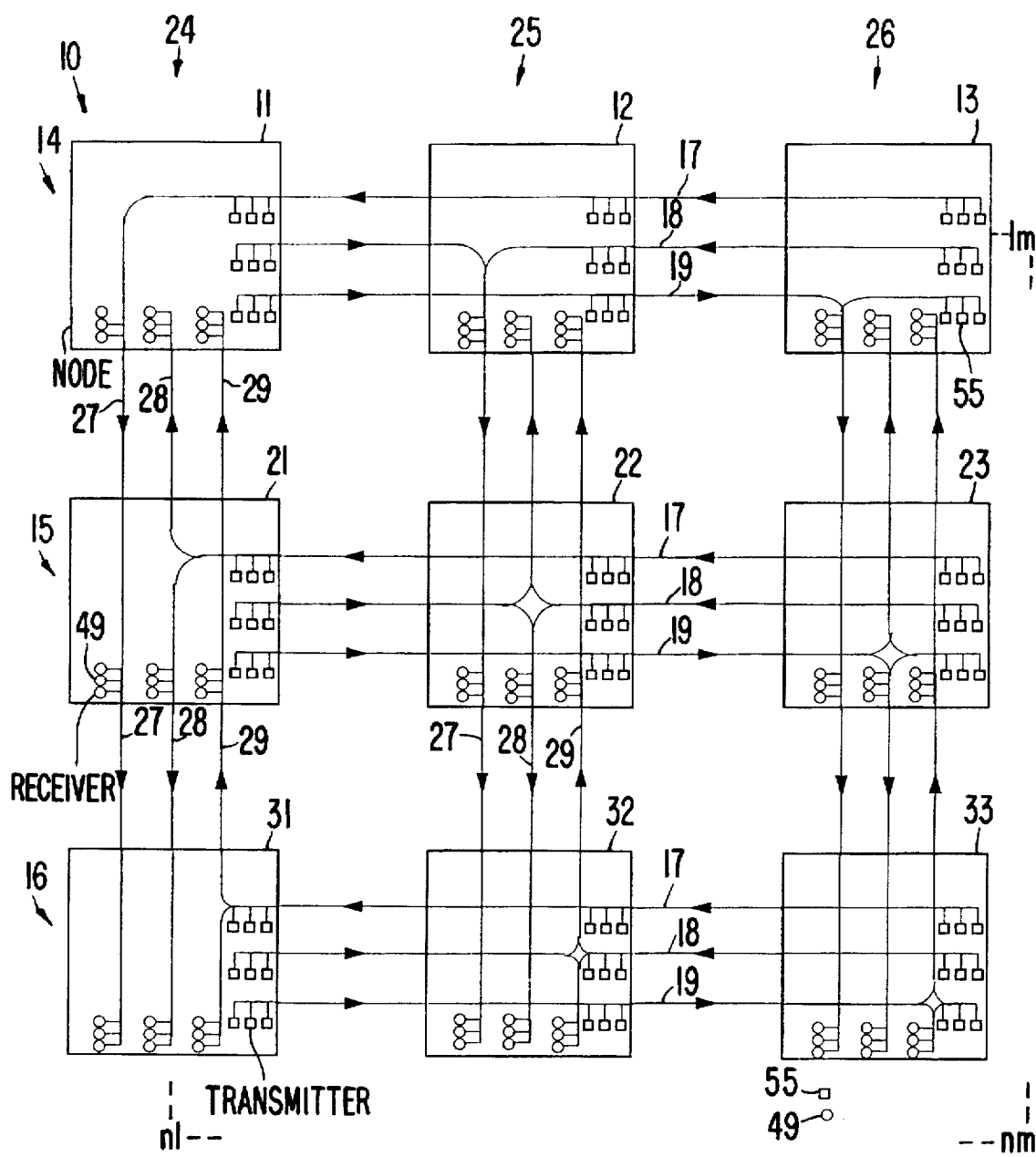
FIG. 1 is a telecommunications network according to the invention with a total of nine nodes, in a schematically simplified block diagram.

Using the network designated in FIG. 1 as a whole by 10, which is formed by a number of nodes 11 to 13, 21 to 23, and 31 to 33 and the data transmission lines connecting them, through which lines the individual nodes 11 to 13, 21 to 23, and 31 to 33 together form a matrix, are connected together along lines 14 to 16 and columns 24 to 26, a complete meshing of nodes 11 to 13, 21 to 23, and 31 to 33 with one another is to be achieved in such fashion that every network node can "address" every other node in the network at the same time, i.e. can send data to the latter and at the same time every node can be "addressed" by every other node, in other words, data can be received from any other node.

The term "data" will be understood hereinbelow to refer to digital modulated signals that are conducted as light fluxes through optical fibers, with the objective information content of these data streams being encoded into the modulation of the light fluxes, while the address information is encoded in various wavelengths of these light fluxes or partly in different wavelengths of these light fluxes and to an additional degree in the time sequence of time slots at which the individual nodes are ready to transmit and receive, or the address information is encoded exclusively in the arrangement of time windows or time slots at which the nodes are ready to transmit or receive.

In the case of the embodiment chosen for explanation, without limitation of its general nature, it is assumed that the network has a total of nine nodes, arranged in a "square" 3×3 matrix, and that the address information is encoded exclusively in the wavelengths of the light fluxes that are digitally modulated to transmit the content information.

In the 3×3 matrix shown, nodes 11, 12, 13 and 21, 22, 23, or 31, 32, 33 arranged in a line 14 to 16 are connected pairwise with one another by three optical fibers 17 to 19. Similarly, nodes 11, 21, and 31 as well as 12, 22, and 32 and 13, 23, and 33 arranged along columns 24 to 36 are likewise connected together by three optical fibers 27 to 29.

In the general case that the number m of nodes is located along a line and the number n is located along a column, the number of optical fibers running in the line direction that each connecting two nodes pairwise with one another is m, and the optical fibers running in the column direction is n, with these fiber bundles being combined into cables. As carriers for the data streams possible within network 10, n×m (in the embodiment shown, 9) light fluxes of the wavelength $\lambda_I, \lambda_{II}, \ldots, \lambda_{IX}$ defined as different are used. Since (n×m−1) nodes must be addressable from each node, each node must also be capable of transmitting and receiving eight light fluxes of the stated wavelengths.

In the general case that the number m of nodes is located along one line and the number n along one column, n×m wavelengths defined as different $\lambda_I, \lambda_{II}, \ldots, \lambda_{n\times m}$ serve as carriers for the data streams possible within network 10, or k wavelengths defined as different $\lambda_1, \lambda_{II}, \ldots, \lambda_{n\times m}$ and j different time slots $S_1, S_2, \ldots, S_j$, which, combined into pairs, represent the addresses I=$(\lambda_I, S_1)$, II=$(\lambda_I S_2) \ldots$ n×m=$(\lambda_1, S_j)$ as carriers for the data streams (whereby n×m must be $\leq$k×j or n×m time slots defined as different $S_I, S_{II}, \ldots, S_{n\times m}$ in which the nodes are respectively able to transmit and receive.

Figure 2:
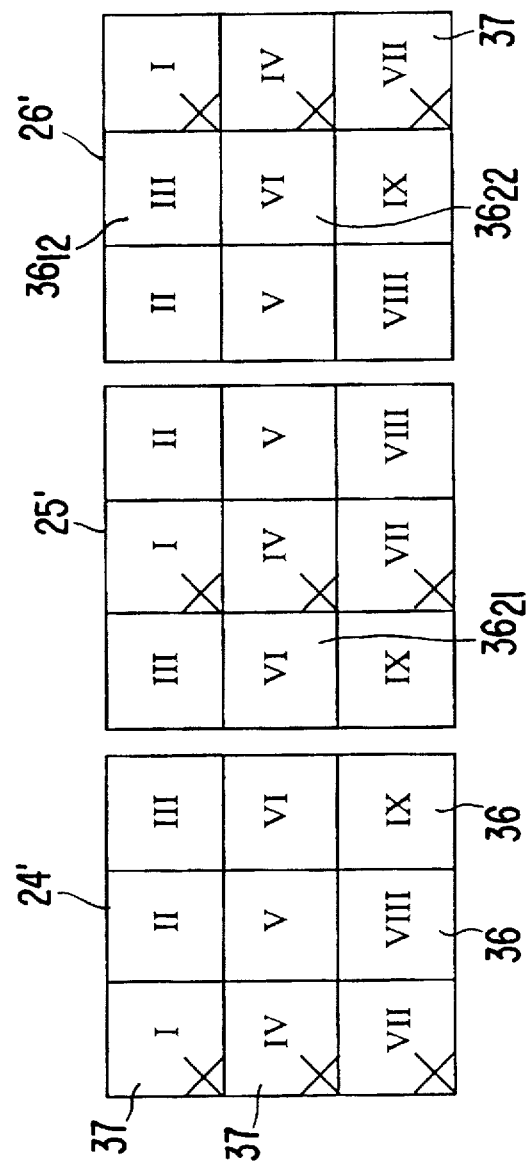
FIG. 2 is an address table to explain the addressing of the nodes of the network according to FIG. 1.

To explain a suitable addressing method in which the addressing of the individual nodes can be performed from any desired node, it should now be mentioned in addition to FIG. 2 in which, in an arrangement of columns 24 to 26 analogous to FIG. 1, corresponding address fields 24' to 26' are shown and within which one of the wavelengths at which the respective nodes can emit an information light flux is represented by a number field 36. These number fields in terms of their matrix-type arrangement correspond to the matrix arrangement of nodes 11 to 13, 21 to 23, and 31 to 33, with a transmitting node being designated by fields 37 "crossed" in each case, and the "target" node that is to be addressed is designated by the arrangement within matrix 36, 37. From the diagram in FIG. 2 it therefore follows that node 12 is addressed by node 11 at wavelength II while node 13 is addressed by node 11 at wavelength III.

The nodes 21 to 23 of network 10 according to FIG. 1 are addressed in this sequence from node 11 by wavelength IV and V as well as VI. Nodes 31 to 33 of network 10 according to FIG. 1 can be addressed by nodes 11 in this network 10, in the sequence given, at wavelengths VII VIII, and IX.

The addressing of the individual nodes via the total of nine light fluxes defines various wavelengths I to IX, firstly by selection of optical fibers 17 to 19 by which columns 24 to 26 are selected as a result, and also by their addressing within one of columns 24 to 26 by the wavelength of the respective information light fluxes.

Optical fibers 17 run from each of the nodes from columns 25 and 26 of network 10 according to FIG. 1 to column 24 of network 10. Optical fibers 18 conduct the light fluxes of the nodes in columns 24 and 26 to column 25 of network 10 and the optical fibers 19 conduct the light fluxes of nodes 11, 12 and 21, 22 as well as 31 and 32 of columns 24 and 25 to column 26 of network 10.

Optical fibers 27 conduct the data streams from nodes 11, 12, and 13 in lines 14 in network 10 according to FIG. 1 to nodes 21 to 23 in line 15 and nodes 31 to 33 in line 16. Optical fibers 28 conduct the light fluxes of the nodes in line 15 to the nodes of lines 14 and 16 and optical fibers 29 conduct the light fluxes of the nodes in line 16 to nodes 11 to 13 and 21 to 23 in lines 14 and 15. For example, if node 32 in this network 10 is to be addressed by node 23 of network 10 according to FIG. 1, this addressing is accomplished by virtue of the fact that via the "middle" optical fiber 18, that links node 23 with "central" node 22 of the network, a light flux with wavelength IX is transmitted that is conducted via the additional "middle" optical fiber 28, linking central nodes 22 with node 32 located below as shown in FIG. 1, to this node 32.

Similarly, according to the address table in FIG. 2, the other nodes can be addressed by each of nodes 11 to 13, 21 to 23, and 31 to 33.

In the general case in which m nodes are provided along a line and n nodes are provided along a column, the number of optical fibers (m−k) supplied unidirectionally in the positive line direction by the k-th node of a line, according to the (m−k) columns with n nodes each, which are addressable by k nodes of the line, and the number of optical fibers (k−1) supplied unidirectionally in the negative line direction with data streams, according to the (k−1) columns with n nodes each. The number of optical fibers traversed "upward" by data streams in the positive column direction unidirectionally from the j-th node of a column is (j−1) according to the (j−1) nodes which are addressable by (n−j) lines with m nodes each, and the number of optical fibers traversed "downward" by data streams in the negative column direction unidirectionally from the j-th node of a column is (n−j) according to the (n−j) nodes, that are addressed by j lines with m nodes each.

As another addressing example, the addressing of node 21 of network 10 according to FIG. 1 from node 12 is explained, which according to the address table in FIG. 2 takes place through wavelength VI, as indicated by number field $36_{21}$ of address field 25'. The light flux of "address" wavelength VI travels through optical fiber 17 connecting node 12 with node 11 to node 11 and is looped through the latter, so to speak, to its output lead 27, which within node 21 reaches a receiver 49 of node 21, which is addressed and controlled thereby.

Figure 3:
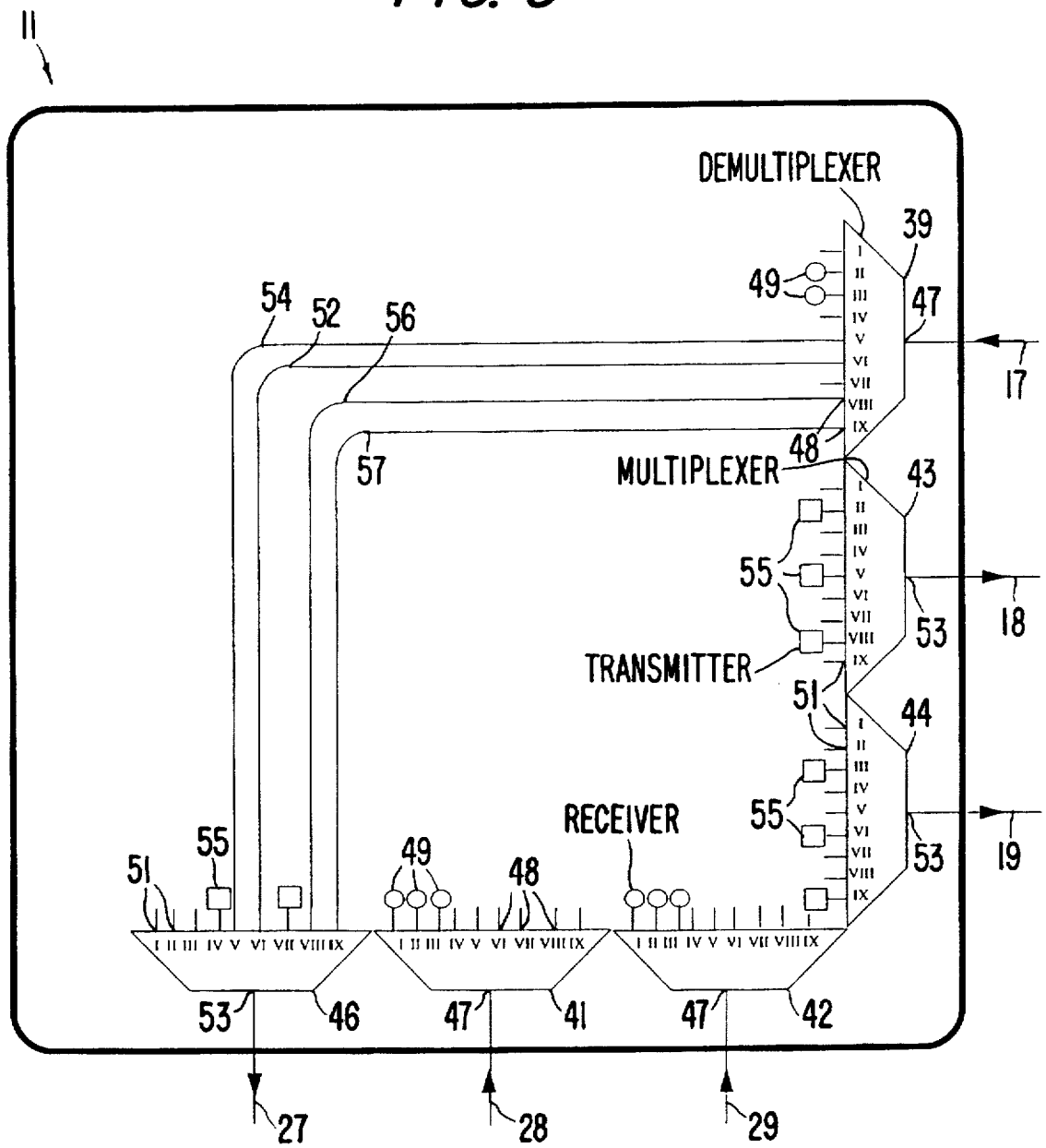
FIG. 3 shows the schematic diagram of a corner node of the network according to FIG. 1, composed of wavelength demultiplexers, wavelength multiplexers, waveguides, transmitters, and receivers.

"Corner nodes" 11, through which the address light flux is conducted to node 21 in the example given, has, in greater detail, the design shown in FIG. 3, to which reference will now be made:

Node 11, in the arrangement shown in detail in FIG. 3, has three wavelength demultiplexers 39 and 41 as well as 42 and three wavelength multiplexers 43 and 44 as well as 46.

The wavelength demultiplexers constitute receiving elements that divide a light flux conducted to them, containing partial light fluxes corresponding to one or more of wavelengths I to IX, into the individual light flux components of the various wavelengths. Accordingly, each of these wavelength demultiplexers 39 and 41 as well as 42 has an optical input 47, to which optical fibers 17 and 28 as well as 29 that lead to node 11 are connected, and nine outputs 48 at which the partial light fluxes associated with the various wavelengths I to IX emerge spatially separated from one another in an orderly sequence, to the extent that they are contained in the total light flux admitted through input 47. Depending on the function of these partial light fluxes, they are either conducted to a receiver 49 that promotes their conversion into electrical signals that are supplied for further electronic processing or to the input side of one of the wavelength multiplexers 46 or 43 or 44 which form the output members of the respective nodes 11 to 13, 21 to 23, and 31 to 33 and have a number of coupling inputs 51 that corresponds to the number of wavelengths I to IX which are linked either with one of outputs 48 of one of the wavelength demultiplexers in order for example simply to further conduct a light flux through node 11, or are connected to a transmitter 55 through which information signals can be coupled into the respective multiplexers 43 or 44 or 46 which represent digital data that are intended to be conducted further by one of the nodes to the node being addressed, and are supposed to be accessible for further processing through the latter.

In corner node 11 shown in FIG. 3, its addressing by node 12 takes place via optical light conducting fiber 28 connected to optical input 47 of wavelength demultiplexer 39, whose light flux component with wavelength VI that is utilized to address node 14 travels via internal waveguide 52 to coupling input 51, likewise associated with wavelength VI of wavelength multiplexer 46 shown at the bottom left in FIG. 3, and from whose optical output 53 it is coupled into optical fiber 34 that leads to node 21. From "input" demultiplexer 39, a second waveguide 54 provided for addressing a node leads to "output" multiplexer 46 to which first waveguide 52 is also connected, with this second waveguide being provided for transmission of light flux with wavelength V by means of which the same node 21 is addressable from the "addressing", "right" corner node 13.

The two additional waveguides 56 and 57, that connect the input wavelength demultiplexer 39 with the output wavelength multiplexer 46 are provided firstly for the addressing of the corner node 31 shown in the bottom left part of FIG. 1 by the upper right node 13 by means of wavelength VIII and also for addressing corner node 31 by the node 12 located between the two corner nodes 11 and 13 of network 10 by means of wavelength IX.

The two wavelength multiplexers 43 and 44 located "below" input demultiplexer 39 are provided firstly for delivering signals for addressing nodes 12, 22 and 32 and 13, 23, and 33 arranged in columns 25 and 26, with the nodes located in column 25 (FIG. 1) being addressable by wavelength multiplexer 43, with the addressing of node 12 taking place by means of wavelength II, the addressing of node 22 by means of wavelength V, and the addressing of node 32 by means of wavelength VIII, using optical fiber is in each case, while nodes 13, 23, and 33 located in column 26 are addressable by means of wavelength multiplexer 44, with the addressing of corner node 13 being performed by means of wavelength III, the addressing of the middle node 23 by means of wavelength VI, and the addressing of the lower right corner node 33 in FIG. 1 by means of wavelength of through optical fiber 19 in each case.

The addressing light fluxes required in this regard are generated by transmitters 55, which are connected to the corresponding inputs 51 of multiplexers 43 and 44 associated with the individual wavelengths of the transmission light fluxes. Transmitter 55 with this function of generating light fluxes which address individual nodes through their wavelengths, are also provided in the "output" multiplexer shown in the bottom left part of FIG. 3, which are used to address nodes 21 and 31 located in the left column 24 of matrix network 10.

Receivers 49 with the function of transforming the data streams encoded in the light fluxes into electrical signal leads are also provided for the wavelengths of demultiplexers 41 and 42, which are connected to outputs 48 of wavelengths I to III in order for lines 15 and 16 of network 10 according to FIG. 1 to be addressed by nodes 21 to 23 and 31 to 33.

In addition, the central cross node 22 shown in FIG. 4 of network 10 is constructed in a manner analogous to the structure of corner node 11 described with reference to FIG. 3, from wavelength demultiplexers 61, 62, 63, 64, and 65, as well as 66, on the one hand and wavelength multiplexers 67, 68, 69, 71, and 72 as well as 73 on the other, to whose inputs 47 and or optical outputs 53 one of optical fibers 17 to 19 or 27 to 29 is connected, through which addressing and information signals are sent to node 22 or are sent out from the latter in the "line direction" or "column direction".

The "internal" waveguides that transmit information signals "in the line direction" are labeled 74, 76, 77 and 78, 79, 81; functionally corresponding light waveguides which transmit the addressing and information signals "in the column direction" through the central nodes are labeled 82, 83, 94 as well as 85, 86, 87, while the light waveguides through which input light fluxes that are conducted through the "middle" optical fibers 29 to the wavelength demultiplexers 62 and 65 are deflected in the direction of second column 25 of matrix network 10, are labeled 88 and 89 as well as 91 and 92.

Depending on the number of light fluxes that are conducted by nodes 11 to 13, 21 and 23, and 31 to 33 to central node 22, said node is provided with a total of eight receivers 49 and central node 22, corresponding to the number of nodes addressable from central node 22, is also provided with eight transmitters 55 each of which transmits on one of the total of eight wavelengths I to III and V to IX.

Figure 5:
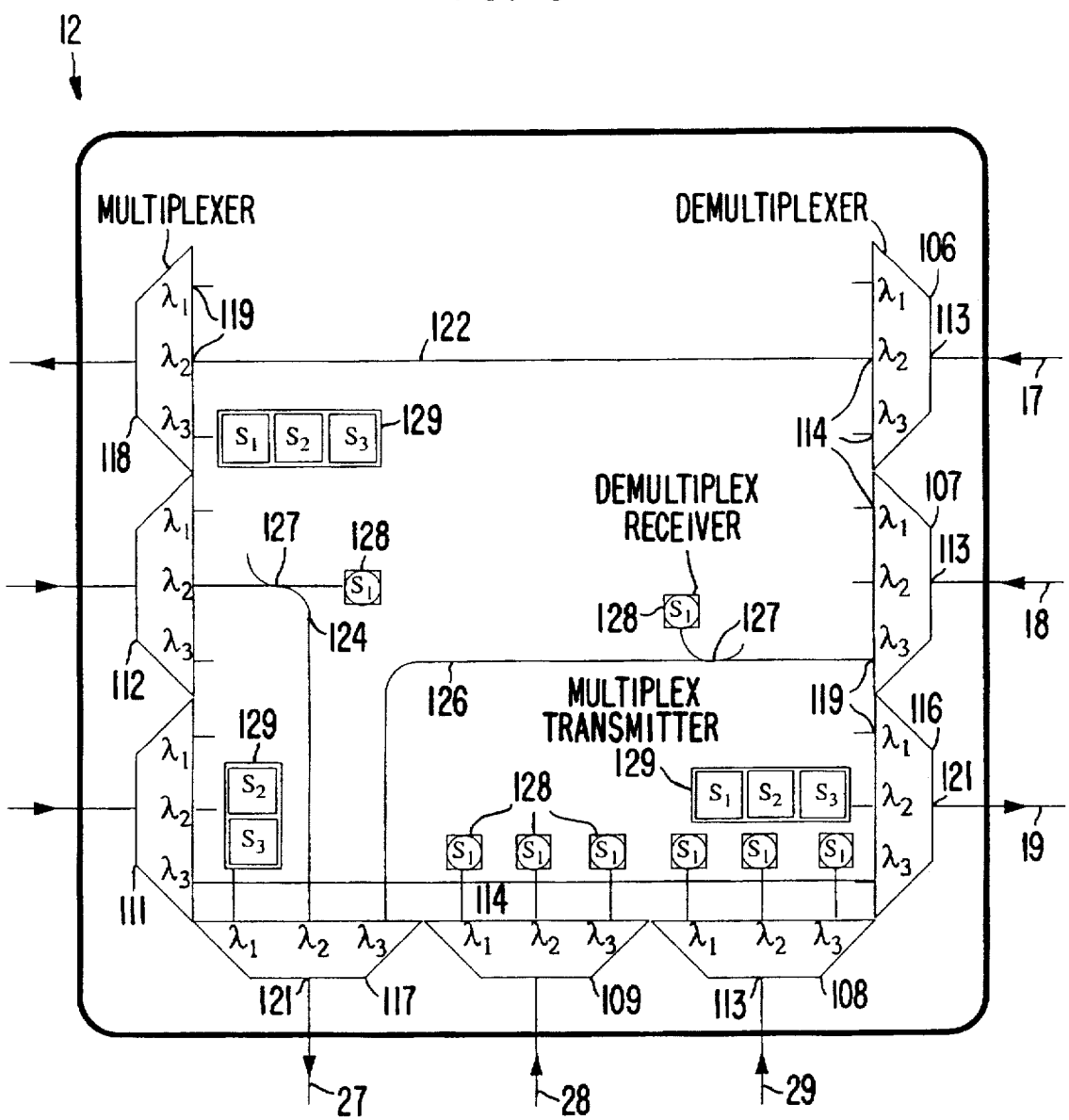
FIG. 5 shows one node of a network whose function is analogous to the network in FIG. 1, in which addressing is performed by a combination of wavelengths and time slots.

In the case of the embodiment shown in FIG. 5, without limitation of its general nature, it is assumed once again that the network has a total of 9 nodes arranged in a "quadratic" 3×3 matrix and that the address information is encoded both into the wavelengths of the light fluxes and into the time slots in which the transmitters and receivers are prepared to send and receive. For the explanation, see Table 1.

TABLE 1

| 101 Address | 102 WDM Gridconnect | 103 WDM/TDM Gridconnect | |
|---|---|---|---|
| I | $\lambda_1$ | $\lambda_1, S_1$ | |
| II | $\lambda_2$ | $\lambda_2, S_1$ | |
| III | $\lambda_3$ | $\lambda_3, S_1$ | |
| IV | $\lambda_4$ | $\lambda_1, S_2$ | 104 |
| V | $\lambda_5$ | $\lambda_2, S_2$ | |
| VI | $\lambda_6$ | $\lambda_3, S_2$ | |
| VII | $\lambda_7$ | $\lambda_1, S_3$ | |
| VIII | $\lambda_8$ | $\lambda_2, S_3$ | |
| IX | $\lambda_9$ | $\lambda_3, S_3$ | |

In the first column 101 of this table, addresses I, II, . . . , IX are listed in the sequence to which the various wavelengths $\lambda_1, \lambda_2, \ldots, \lambda_9$ listed in column 102 or the wavelength-time slot pairs $(\lambda_1, S_1), (\lambda_2, S_1), (\lambda_3, S_1), (\lambda_1, S_2), \ldots, (\lambda_3, S_3)$ 104 of wavelengths $\lambda_1, \lambda_2,$ and $\lambda_3$ listed in column 103 and the time slots $S_1, S_2,$ and $S_3$ are assigned. With this allocation of wavelength-time slot pairs to addresses by analogy with the address table in FIG. 2, address fields 24' to 26' in FIG. 2 can be used to describe the addressing method of the second embodiment. For this purpose, reference is now made to FIG. 5 that shows second node 12 of first line 14 of network 10 according to FIG. 1 in greater detail:

Wavelength demultiplexers 106 to 108, and 109, 111, and 112 as receiving elements decompose the light fluxes that are fed into their optical inputs 113 through optical fibers 17, 18, 29, 28, and 19 into partial light fluxes with wavelengths $\lambda_1, \lambda_2,$ and $\lambda_3$ that emerge again at optical outputs 114. Wavelength multiplexers 116 to 118 guide the partial light fluxes with wavelengths $\lambda_1, \lambda_2,$ and $\lambda_3$ fed in at optical inputs 119 to optical outputs 121 at which optical fibers 19, 27 and 17 are connected together once more to a single optical waveguide. Then, as already described with reference to the first embodiment, the data streams emerging from node 13 are looped through to column 24 of network 10 according to FIG. 1 and the output data streams of node 11 are fed to column 26 of network 10 according to FIG. 1, with a light waveguide 122 connecting optical output 114, associated with wavelength $\lambda_2$, of wavelength demultiplexer 106 with optical input 119, associated with wavelength $\lambda_2$ of wavelength multiplexer 118, and another light waveguide 123 connects optical output 114, associated with wavelength $\lambda_3$, of wavelength demultiplexer 111 with optical input 119, associated with wavelength $\lambda_3$, of wavelength multiplexer 116. In addition, optical waveguide 124 and 126 connect optical outputs 114 of wavelength demultiplexers 107 and 112 with optical inputs 119 of wavelength multiplexers associated with wavelengths $\lambda_2$ and $\lambda_3$. Optical power dividers 127 allow time demultiplex receivers 128 to receive the data streams transmitted within time slot $S_1$ that are used according to the address table in FIG. 2 and the allocation according to Table 1 for addressing node 12. When the data streams are transmitted by nodes 21 to 23 and 31 to 33 to the nodes of column 25 of network 10 according to FIG. 1 at node 12, time demultiplex receivers 128 can directly tap the partial light fluxes at optical outputs 114 of wavelength demultiplexers 108 and 109 and use them to detect the data streams within time slot $S_1$.

Time multiplex transmitters 129 each transmit on one of wavelengths $\lambda_1$, $\lambda_2$, and $\lambda_3$ a light flux with three partial data streams that can be accessed within time slots $S_1$, $S_2$ and $S_3$. These light fluxes are guided to optical inputs 119 of wavelength multiplexer 116, 117, and 118, each of which is allocated to one of wavelengths $\lambda_1$, $\lambda_2$, and $\lambda_3$ in accordance with address column 24 or 25 or 26 of network 10 according to FIG. 1. A light flux conducted for example from node 13 of network 10 according to FIG. 1 to central node 22 is encoded on fiber 18, wavelength $\lambda_3$, and time slot $S_2$ according to address field 27' and number field $36_{22}$ in FIG. 2 and the allocation of column 103 of Table 1 and is received at node 12 of network 10 according to FIG. 1 at optical input 113 of wavelength demultiplexer 107 according to FIG. 5. The light flux emerges at optical output 114 of wavelength demultiplexer 107 associated with wavelength $\lambda_3$ and is received by wave guide 126, from which optical power is decoupled at power divider 127 and fed to time demultiplexer receiver 128 in order to be guided at optical input 119 of wavelength multiplexer 117, associated with wavelength $\lambda_3$ to optical fiber 27 through optical output 121.

The light flux is fed to the determining node 22 over this optical fiber 27. The data stream which is fed from node 13 of network 10 according to FIG. 1 to node 12 is encoded by the choice of fiber 18, wavelength $\lambda_3$, and time slot $S_1$ according to address field 26' and number field $36_{12}$ in FIG. 2, and the allocation of column 103 in Table 1 and is received at node 12 of network 10 according to FIG. 1 at optical input 113 of wavelength demultiplexer 107 according to FIG. 5. Similarly, at the light flux associated with wavelength $\lambda_3$ at optical output 114 of wavelength demultiplexer 107, the emerging light flux is received by waveguide 126, decoupled from the optical power at power divider 127 and delivered to time demultiplex receiver 128. In the electronic range, the latter can separate the partial data stream transmitted within time slot $S_1$ from the partial data streams transmitted within time slots $S_2$ and $S_3$ and thus result in a reuse. Similarly in this fashion, each of nodes 11 to 13, 21 to 23, and 31 to 33 of network 10 according to FIG. 1 can address and respond to every other node 11 to 13, 21 to 23, and 31 to 33 and can also receive data from each of these nodes 11 to 13, 21 to 23, and 31 to 33.

Similarly to the method described in the first embodiment, addressing with n×m time slots defined as different can take place, but for this time multiplexing and time demultiplexing in the optical range are required that assume synchronization of the light fluxes from one another. The wavelength multiplexers 43, 44, 46 according to FIG. 3 and 68, 69, 72, and 73 according to FIG. 4 would then be replaced by optical time multiplexers and the wavelength demultiplexers 39, 42, 41 according to FIG. 3 and 61, 62, 63, 64, 65, and 66 according to FIG. 4 would be replaced by optical time demultiplexers.

Figure 6:
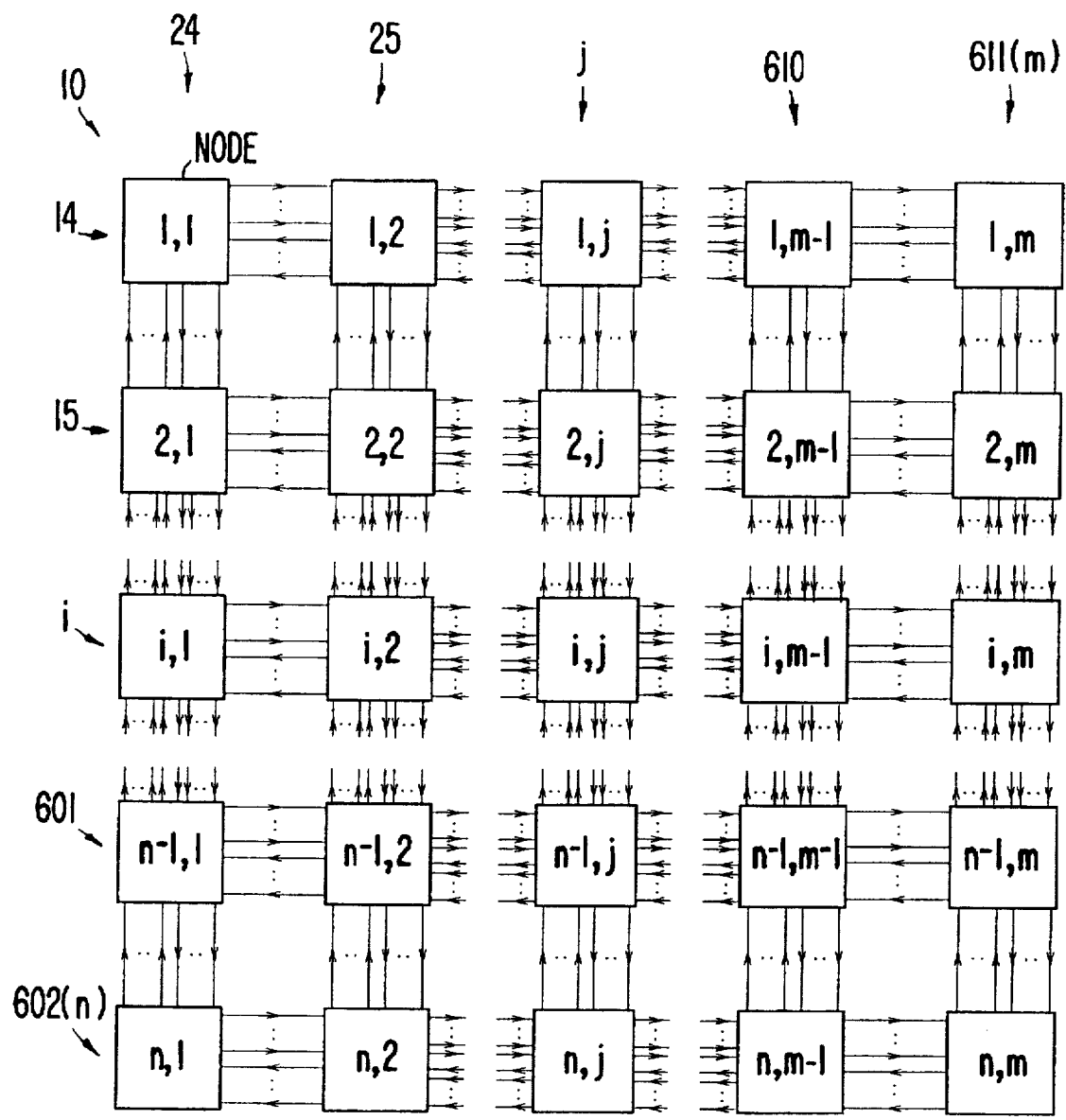
FIG. 6 shows a transport network according to the invention with maximized utilization of the transmission capacity of the fibers employed with m·n nodes in a schematically simplified block diagram.
Figure 7:
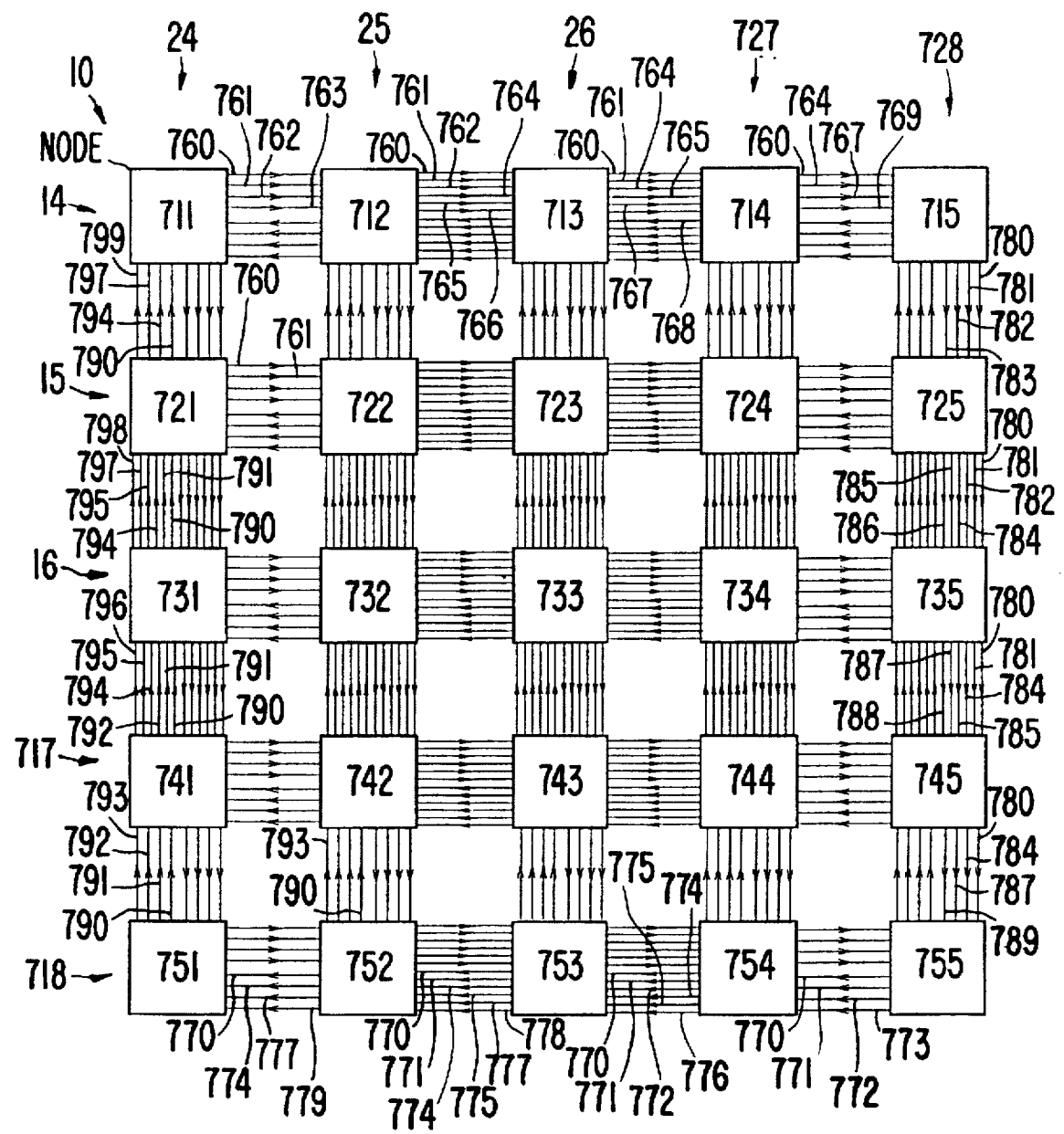
FIG. 7 shows a transport network according to the invention with maximized utilization of the transmission capacity of the fibers used, with 5×5, in other words a total of 25, nodes in a schematically simplified block diagram.

For the additional embodiment shown in FIGS. 6 and 7 of a network 10 with maximized utilization of the transmission capacity provided by glass fiber links, it is also assumed that the network designated in FIG. 6 as a whole by 10, generally comprises n·m nodes. Lines 14, 15 to 601 and 602(n) of network 10 are marked with an i and columns 24, 25 to 610 and 611(m) of network 10 are marked with a j, where i=(1, 2, ..., n−1, n) and j=(1, 2, ..., m−1, m). Nodes (1,1 to n,m) are given the corresponding index combination i,j corresponding to their line i and their column j.

From each node (I,1) of column 24 (m−1) optical glass fibers run in the "mathematically" positive line direction (from "left" to "right") to adjacent nodes (i,2). From each node (i,m) in column 611, (m−1) optical glass fibers run in the mathematically negative line direction (from "right" to "left") to adjacent nodes (i,(m−1)). From each node (1,2 to 1,(m−1); 2,2 to 2,(m−1); ...; n,2 to n,(m−1)) of columns 25 to 610 (m−j)·j optical glass fiber connections are drawn in the mathematically positive line direction to the adjacent nodes (i,(j+1)) of line i and (m−j+1)·(j−1) glass fiber connections are drawn in the mathematically negative line direction to adjacent nodes (i,(j−1)) of line i. Thus, between nodes (1,1 to n,m) there is a pairwise connection that is symmetrical in the propagation direction of the light fluxes of 2·(m−j)·j fibers between nodes (i,j) and (i,(j+1)) of line i. From each node (1,j) of line 14, (n−1) optical glass fibers extend in the mathematically positive column direction (from "top" to "bottom") to the adjacent nodes (2,j). From each node (n,j) of line 602, (n−1) optical glass fibers extend in the mathematically negative column direction (from "bottom" to "top") to the adjacent nodes ((n−1)j). From each node (2,1; ...; 2,m; ...; (n−1),1; ...;(n−1),m) of lines 15 to 601 (n−i)·i optical glass fiber connections run in the mathematically positive column direction to the adjacent nodes ((i+1)j) of column j and (n−i+1) (i−1) glass fiber connections run in the mathematically negative column direction to the adjacent noes ((i−1),j) of column j. Thus, between nodes (1,1 to n,m) there is a pairwise connection that is symmetrical in terms of the propagation direction of the light fluxes of 2·(n−i)·i fibers between nodes (i,j) and ((i+1)j) of column j.

To explain the addressing method suitable for maximizing the utilization of the transmission bandwidth of the fibers, reference will now be made to FIG. 7 and Table 801 in FIGS. 8a and 8b. In the network 10 shown in FIG. 7, without limitation of generality, 25 nodes (711-715, 721-725, 731-735, 741-745, 751-755) are provided arranged in a "quadratic" 5×5 matrix. These nodes are connected by the data transmission lines (glass fibers) (760-779) and (780-799) pairwise along lines 14, 15, 16, 717, and 718 and along columns 24, 25, 26, 727, and 728 into a lattice network.

Figures 8A, 8B:
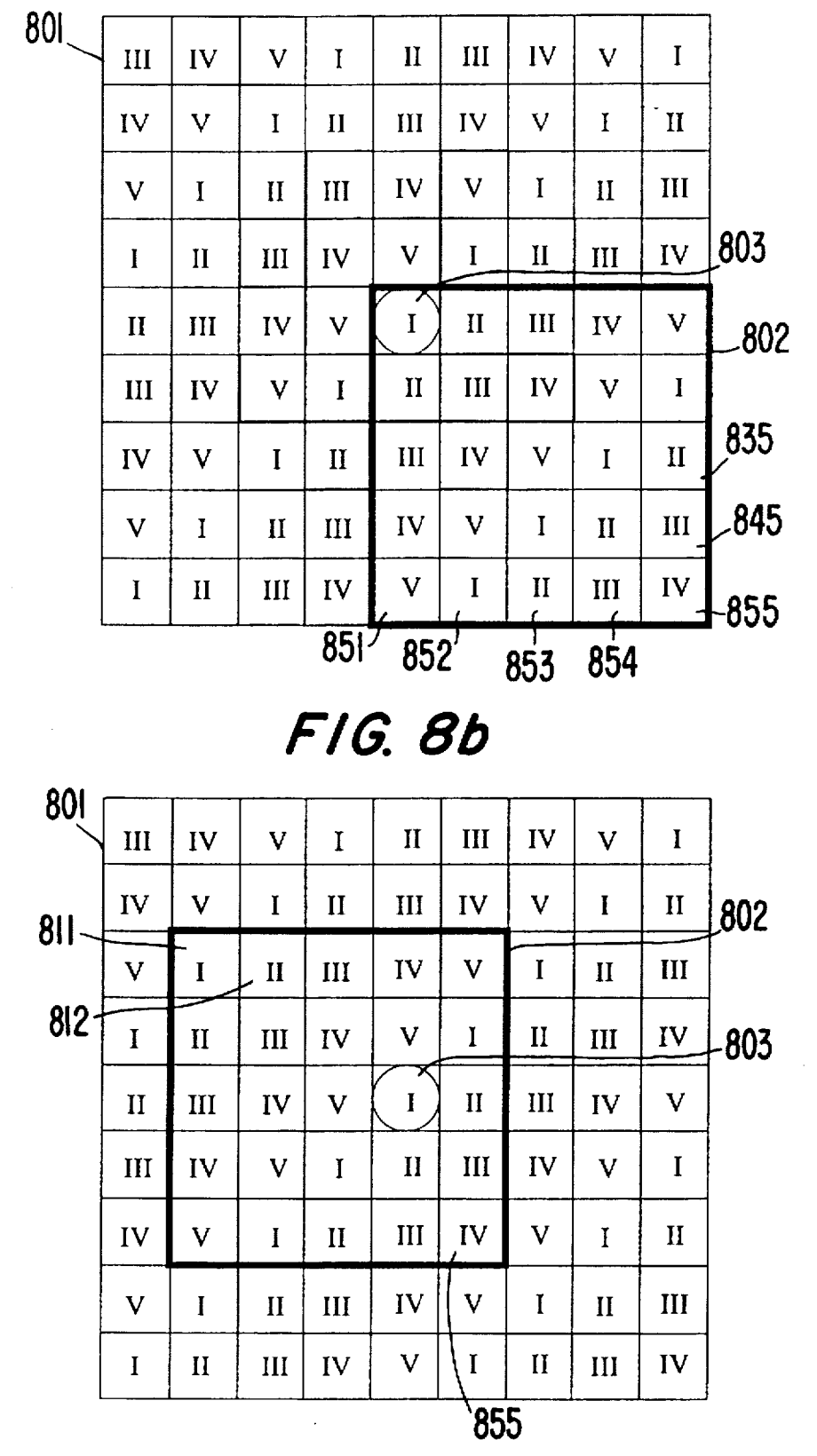

In FIGS. 8a and 8b, an address table 801 is shown in two different positions of a "read frame" 802 that correspond to two different "addressing tasks" with FIGS. 8a and 8b showing the case in which the wavelength FIGS. I to V located inside the frame window indicate the wavelengths at which all other nodes in network 10 according to FIG. 7 can be addressed from node 1,1, while the position of read frame 802 in FIG. 8b corresponds to the problem of being able to read the wavelengths by which all other nodes of the network are addressable from nodes 3,4, naturally in combination with the selected fiber in each case through which this node is connectable with the other nodes of this network.

The address table is constructed so that the transmitting node is represented by central field 803 in the circle and, depending on the position of frame 802, its indexing within the network according to FIG. 7 of the transmitting node is selected. Its indexing is sought, so to speak, in the "matrix arrangement" of read frame 802 and the read frame is positioned so that the node corresponding to the desired indexing coincides with field 803 of address table 801. It is then possible to read immediately within read frame 802 the wavelengths at which the other nodes of the network can be addressed from the transmitting node.

Accordingly, nodes 721, 731, 741, and 751 in column 24 in FIG. 7 are addressed by node 711 with wavelengths II, III, IV, and V. Nodes 712, 722, 732, 742, and 752 in column 25, nodes 713, 723, 733, 743, and 753 in column 26, nodes 714, 724, 734, 744, and 754 in column 727, and nodes 715, 725, 735, 745, and 755 in column 728 are addressed by nodes 711 at wavelengths I, II, III, IV, and V.

Fibers 760 to 779 of lines 14, 15, 16, 717, and 718, which connect columns 24, 25, 26, 727, and 728 pairwise with one another, are designated in accordance with the original column and the target column of the transported data streams conducted by the fiber. Similarly, fibers 780 to 799 in column 24, 25, 26, 727, and 728 which connect lines 14, 15, 16, 717, and 718 pairwise with one another are designated in accordance with the original line and target line of the data streams transported by the fiber. The fibers of lines 14, 15, 16, 717, 718 accordingly are referred to as follows: "from column $j_{transmitter}$ to column $j_{receiver}$" and the fibers of columns 24, 25, 26, 727, and 728 are referred to as follows: "from line $i_{transmitter}$ to line $i_{receiver}$."

The designations of all the fibers 760 to 799 in network 10 are listed in Table 2. It is evident from columns 201 and 202 in Table 2 that fibers 760 that lead the data streams coming from nodes 711, 721, 731, 641, and 751 of column 24 to nodes 715, 725, 735, 745, and 755 of column 728 according to FIG. 7, are referred to as those fibers which carry data streams "from column one (24) to column five (728)" (C1→C5), and those fibers are referred to as fibers 762 that conduct the light fluxes coming from nodes 711, 721, 731, 741, and 751 in column 24 to nodes 713, 723, 733, 743, and 753 in column 26 according to FIG. 7, in other words, as the fibers that carry data streams "from column one (24) to column three (26)" (C1→C3).

TABLE 2

| 760 | C1→C5 | 770 | C5→C1 | 780 | R1→R5 | 790 | R5→R1 |
|---|---|---|---|---|---|---|---|
| 761 | C1→C4 | 771 | C5→C2 | 781 | R1→R4 | 791 | R5→R2 |
| 762 | C1→C3 | 772 | C5→C3 | 782 | R1→R3 | 792 | R5→R3 |
| 763 | C1→C2 | 773 | C5→C4 | 783 | R1→R2 | 793 | R5→R4 |
| 764 | C2→C5 | 774 | C4→C1 | 784 | R2→R5 | 794 | R4→R1 |
| 765 | C2→C4 | 775 | C4→C2 | 785 | R2→R4 | 795 | R4→R2 |
| 766 | C2→C3 | 776 | C4→C3 | 786 | R2→R3 | 796 | R4→R3 |
| 767 | C3→C5 | 777 | C3→C1 | 787 | R3→R5 | 797 | R3→R1 |
| 768 | C3→C4 | 778 | C3→C2 | 788 | R3→R4 | 798 | R3→R2 |
| 769 | C4→C5 | 779 | C2→C1 | 789 | R4→R5 | 799 | R2→R1 |

From columns 205 and 206 of Table 2 we can see that fibers 787 that conduct the light fluxes coming from nodes 731, 732, 733, 734, and 735 in line 16 to nodes 751, 752, 753, 754, and 755 of line 718 according to FIG. 7 are referred to as those fibers that carry data streams "from line three (16) to line five (718)" (R3→R5).

The addressing of the individual nodes through the total of five light fluxes with wavelengths I to V defined as different, is accomplished by selecting the optical fibers 760 to 779 by which columns 24, 25, 26, 727, and 728 are selected as a result, and also by their addressing within one of columns 24, 25, 26, 727, and 728 by the wavelength of the corresponding information light fluxes.

The choice of fibers is made in accordance with Table 2 and the choice of wavelengths is made using address table 801 as shown in FIGS. 8a and 8b.

For example, if node 742 in this network 10 is to be addressed by node 711 in network 10 according to FIG. 7, its addressing takes place as follows: a light flux with wavelength V (FIG. 8a, number field 842) is transmitted through optical fiber 760, connecting node 711 (1,1) with node 712 of the network, said flux being conducted by means of additional fibers 781 via nodes 722 and 732 to this node 742. As another addressing example, the addressing of node 721 of network 10 from node 734 is explained according to FIG. 7, which takes place according to the address table in FIG. 8b at wavelength II, as indicated by the number field 822 of address field 801. The light flux of "address" wavelength II travels through optical fiber 774 linking nodes 733 and 732 with node 731 to reach node 731 and is looped through the latter, so to speak, to its output lead 798 which, within node 721, reaches a receiver 49 of this node 721, which is addressed and controlled thereby.

By selecting the five wavelengths I, II, III, IV, and V defined as different for addressing within one of lines 14, 15, 16, 717, and 718 of network 10, it turns out that none of wavelengths I, II, III, IV, and V is used twice within one of fibers 780 to 799. By cyclic reversal of the five wavelengths I, II, III, IV, and V defined as different in lines 814, 815, 816, 817, and 818 of address table 801 that are analogous to lines 14, 15, 16, 717, and 718 of network 10 (number fields 811 to 815, 821 to 825, 831 to 835, 841 to 845, and 851 to 855) it turns out that none of the wavelengths is used twice within one of fibers 760 to 799. In the general case that m nodes are arranged along a line and n nodes are arranged along a column, the number of wavelengths to be selected that are defined as different corresponds to the larger of the two numbers.

Figure 4:
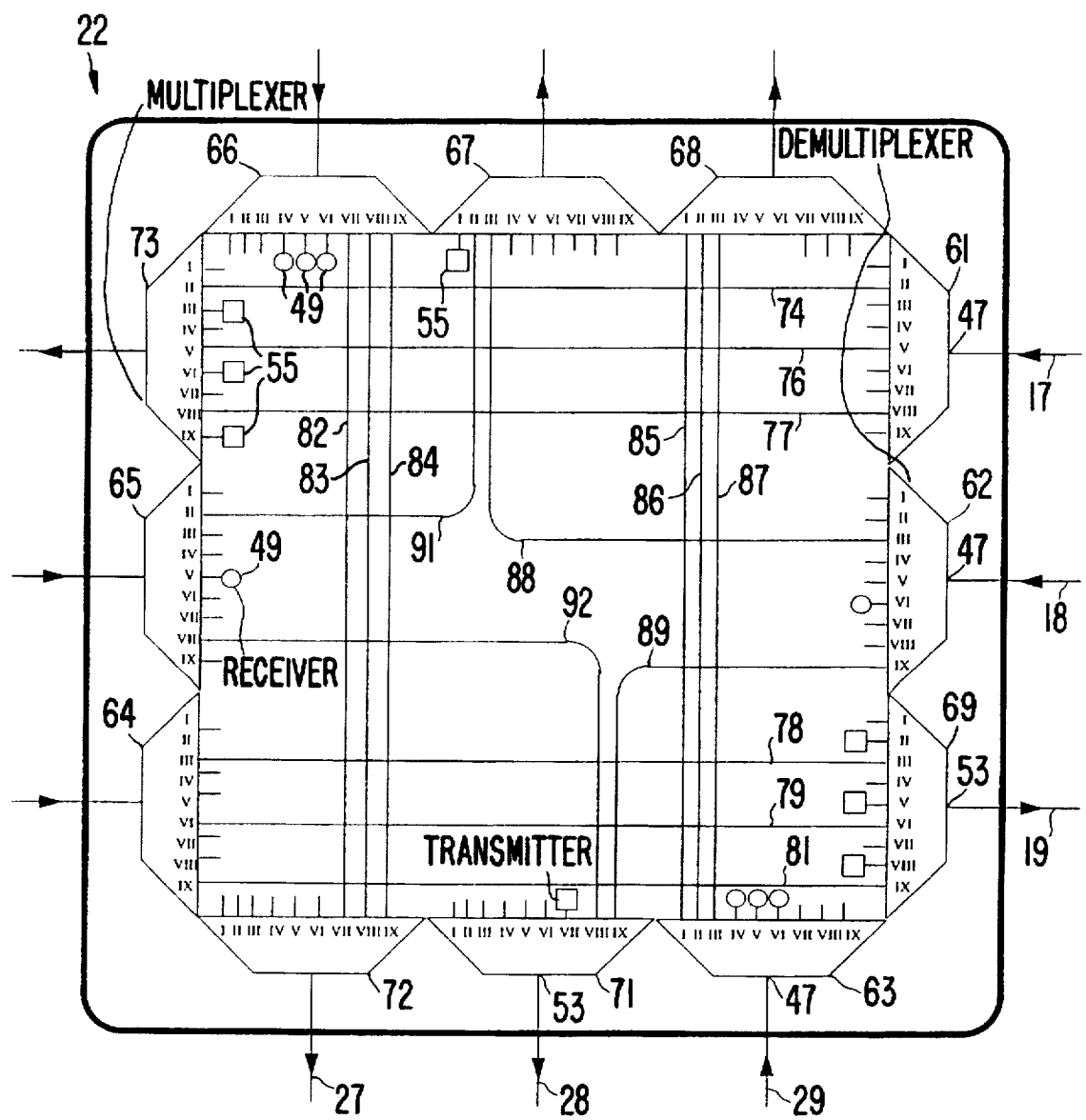
FIG. 4 shows the structure of the central node of the network according to FIG. 1 in a view similar to FIG. 3.

Nodes (711-715, 721-725, 731-735, 741-745, 751-755) can have a structure analogous to that described in FIGS. 3 and 4, whereby each fiber 760 to 799 that leads to a node at input 47 of a wavelength demultiplexer that spatially separates the five wavelengths of the light flux defined as different and steers the light signals to waveguides at its outputs 48. These waveguides in turn lead either to a receiver 49 or to one of inputs 51 of the wavelength multiplexers that bring together the light fluxes of the wavelengths defined as different to a common output 53. The signals from transmitters 55 on waveguides are likewise brought to these inputs 51. Each of outputs 53 feeds the light flux resulting from a superimposition of the light fluxes of the five wavelengths I, II, III, IV, and V defined as different into one of fibers 760 to 799 extending from nodes (711-715, 721-725, 731-735, 741-745, 751-755). Depending on the number of light fluxes that can be transported from nodes (711-715, 721-725, 731-735, 741-745, 751-755) to any other node, each of these nodes is provided with a total of twenty-four receivers 49, each of which can receive on one of the total of five wavelengths I to V, and with twenty-four transmitters 55 that can transmit on one of the total of five wavelengths I to V. In the general case that m nodes are located along a line and n are located on a column, the number of receivers 49 and transmitters 55 in each node is (m·n−1), with each of the m−1 wavelengths defined as different that are used for addressing within a line being utilized n times. The first of the m wavelengths I defined as different is utilized according to address table 801 in FIGS. 8a and 8b only (n−1) times.

Figure 9:
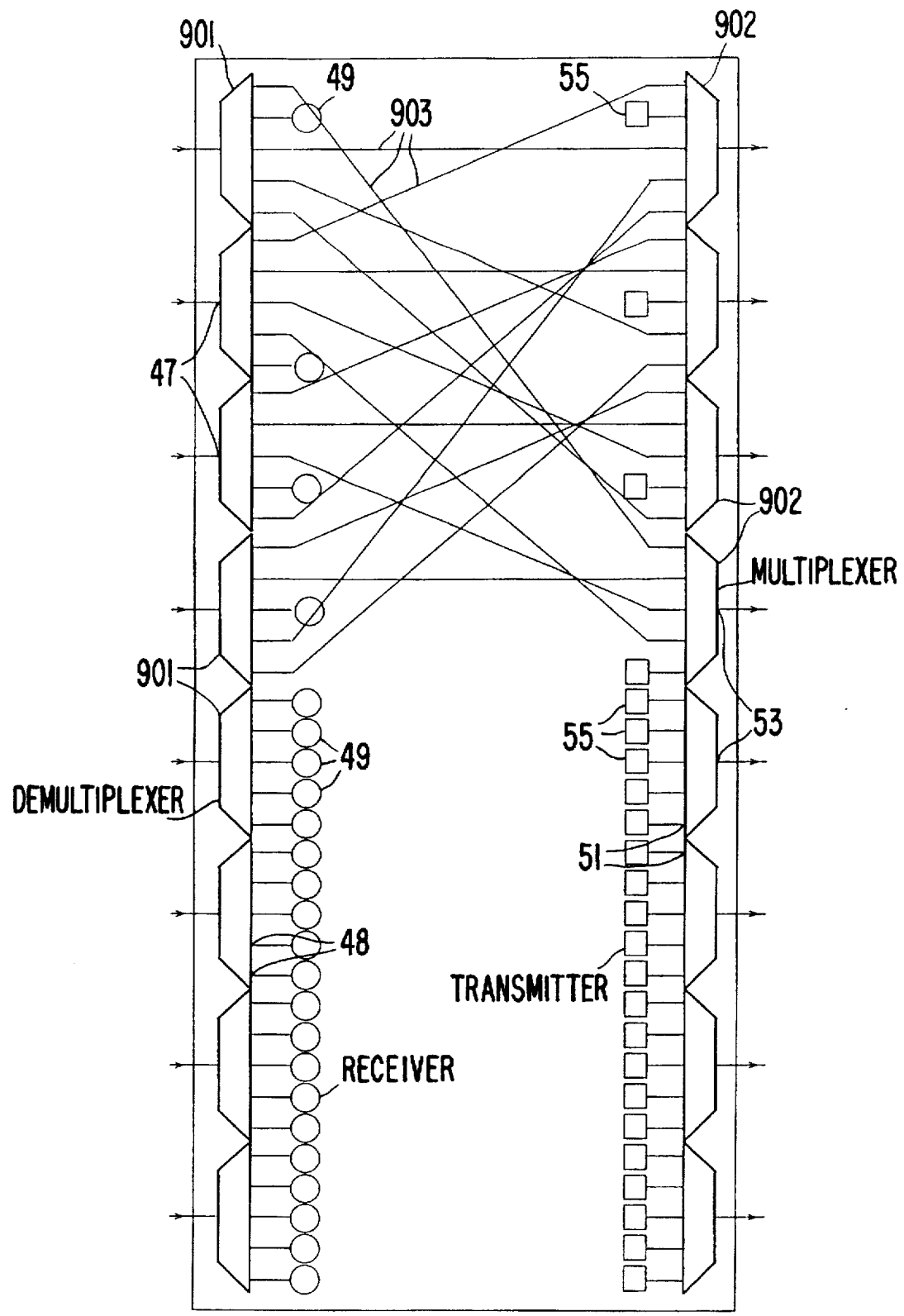
FIG. 9 shows the structure of a node of the network according to FIG. 7 composed of wavelength demultiplexers, wavelength multiplexers, waveguides, transmitters, and receivers.

To create network 10 explained in FIGS. 6 and 7, as well as 8a and 8b, the design of its nodes is provided that is explained in FIG. 9 and is uniform for all nodes in the network.

Those fibers that carry light fluxes that go from one line or one column of network 10 to one line or one column of network 10, neither of which corresponds to that of node (i,j)

are simply conducted through at node (i,j). In the line direction, there are 2·(m−j)·(j−1) fibers and in the column direction, 2·(n−i)·(i−1) optical glass fibers. The remaining (m−1) fibers that transmit data coming from nodes in line i to column j and the (n−1) fibers that transport the light fluxes from lines (1, 2, ..., i−1, i+1, ..., n) to nodes (i,j) are conducted to inputs 47 of wavelength demultiplexer 901 according to FIG. 9. Wavelength demultiplexers 901 separate the light fluxes of wavelengths I, II, III, IV and V defined as different spatially and conduct these light fluxes to outputs 48. At these outputs 48, the light fluxes are picked up either by receivers 49 or waveguides 903. Receivers 49 convert the optical signal into an electrical signal and conduct it for further use. Waveguides 903 conduct the light fluxes corresponding to the target nodes associated with the data to inputs 51 of wavelength multiplexers 902 according to FIG. 9 that bring together the light fluxes of wavelengths I, II, III, IV, and V defined as different to a common output 53. Each of these outputs 53 of wavelength multiplexer 902 feeds the light flux resulting from the superimposition of the light fluxes of the five wavelengths I, II, III, IV, and V defined as different to one of the glass fibers that lead to lines (1,2, ..., i−1, i+1, ..., n−1, n). (M−1) transmitters 55 of node (i,j) of network 10, each of which generates a light flux for data transmission to one of the (M−1) other nodes of the network are likewise connected to inputs 51 of wavelength demultiplexers 902 of node (i,j). The transmitted light fluxes then reach, likewise through outputs 53 of wavelength demultiplexer 902, the (m−1) fibers that run from nodes (i,j) to the (m−1) columns (1,2, ..., j−1, j+1, ..., m−1, m) of network 10.

In linking outputs 41 of wavelength demultiplexer 901 by means of wave guide 903 to inputs 15 of wave multiplexer 902 according to FIG. 9, a cyclic reversal is performed between wavelength demultiplexers 901 and wavelength multiplexers 902 for each of the five wavelengths I, II, III, IV, and V. This results in the function of a "WDM-Crossconnects."

The use of this structure according to FIG. 9 is provided for all nodes (1,1 to m,n) of network 10 and must be performed separately for each node only during the occupation of inputs 47 of wavelength demultiplexer 901 and outputs 53 of wavelength multiplexer 902.

For example, if the structure of FIG. 9 constitutes nodes 712 (1,2) of network 10, the names of the fibers at inputs 47 read as follows from "top" to "bottom": (C1→C2), (C3→C2), (C4→C2), (C5→C2), (R2→R1), (R3→R1), (R4→R1), (R5→R1) and the fibers at output 53 read as follows in this sequence from "top" to "bottom": (R1→R2), (R1→R3), (R1→R4), (R1→R5), (C2→C1), (C2→C3), (C2→C4), (C2→C5).

For example, if the structure in FIG. 9 constitutes nodes 755 (5,5) of network 10, the fibers at inputs 47 read as follows in this sequence from "top" to "bottom": (C4→C5), (C1→C5), (C2→C5), (C5→C5), (R1→R5), (R2→R5), (R3→R5), (R4→R5) and the fibers at outputs 53 read as follows in this sequence from "top" to "bottom": (R5→R1), (R5→R2), (R5→R3), (R5→R4), (C5→C1), (C5→C2), (C5→C3), (C5→C4).

In the general case where network 10 has m columns and n lines, and without limitation of generality, m is made ≥n, for each node 2·(m−1) wavelength demultiplexer 901 is required with m outputs 48 and 2·(m−1) wavelength multiplexer 902 with m inputs 51.

Figure 10A:
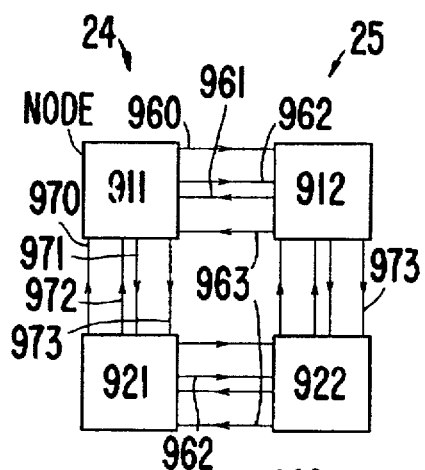
FIGS. 10a to 10d show the "comb structures" of the network according to FIG. 7 that are required to generate paths that are spatially disjunctive from the lines and columns of the network.
Figure 10B:
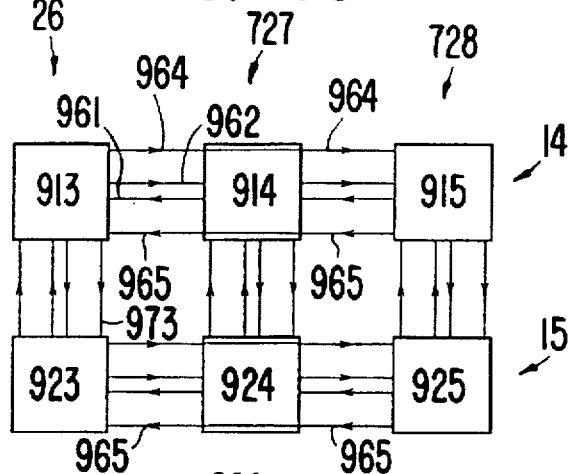

To explain the special expansion of network 10, as described with reference to FIGS. 6 to 9, reference will now be made to FIGS. 10a to 10b and 11. The nodes shown in FIGS. 10a, 10b, 10c, and 10d (911-915, 921-925, 931-935, 941-945, 951-955) correspond to nodes (711-715, 721-725, 731-735, 741-745, 751-755) of FIG. 7 and are connected pairwise with one another by fibers 960 to 965 and 970 to 975. FIGS. 10a, 10b, 10c, and 10d constitute basic segments that make it possible to supplement a network 10 according to FIG. 6 that comprises m·n nodes in the general case. In the case when m and n are even numbers, only m·n/4 segments according to FIG. 10a are used in addition. In the case where m is an even number but n is an odd number, m·(n−3)/4 segments are used according to FIG. 10a and m/2 segments are used according to FIG. 10c. In the case where m is an odd number but n is an even number, n·(m−3)/4 segments are used according to FIG. 10a and n/2 segments are used according to FIG. 10b. In the case where m and n are odd numbers, (m−3)·(n−3)/4 segments are used according to FIG. 10a and (n−3)/2 segments are used according to FIG. 10b and (m−3)/2 segments are used according to FIG. 10c as well as one segment according to FIG. 10d for expansion.

Figure 10C:
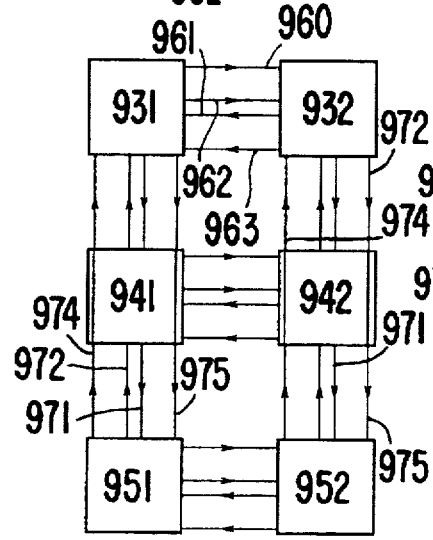
Figure 10D:
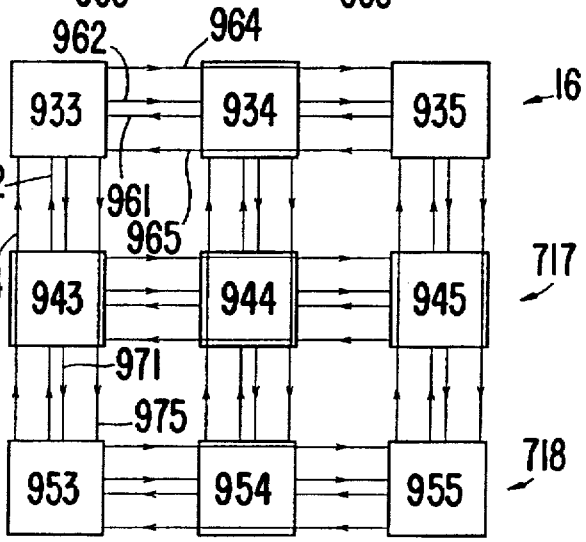

The expansion of network 10 takes place in the form of "comb structures" that permit a spatially disjunctive selection of an alternative propagation path between two nodes of a line i or a column j. From nodes 911, 921, 931, 941, and 951 for example, as shown in FIGS. 10a or 10c, by means of fibers 960, those light fluxes that are guided in network 10 as shown in FIG. 7 along column 24 can be supplied, so to speak, to the "teeth" of the comb structure in column 25 that forms the "back" of the comb structure. Since the light fluxes between nodes 912, 922, 932, 942, and 952 must also be "rerouted" from column 25, the transmission capacity that has become available for transmitting the data for nodes in column 24 with one another along the "back" of the comb structure is used. Fibers 963 again carry light fluxes "from column 24 to column 24" along the "teeth" of the comb structure back to column 24. The same "comb structure" is utilized symmetrically by means of fibers 961 and 962 to "reroute" the data streams from column 25 through column 24. The provision of the "comb structures" required for expansion for the case of an odd number of columns is shown in FIGS. 10b and 10d, with column 26 representing the "back" of a comb, whose "teeth" are formed by fibers 964 and 965, which are connected with column 728. Column 727 conducts the rerouted data streams that are guided in network 10 according to FIG. 7 along column 26 and are conducted by means of fibers 961 and 962 of column 727. Similarly, an expansion for "rerouting" the light fluxes within lines 14, 15, 16, 717, and 718 is accomplished similarly by fibers 970 to 975.

Figure 11:
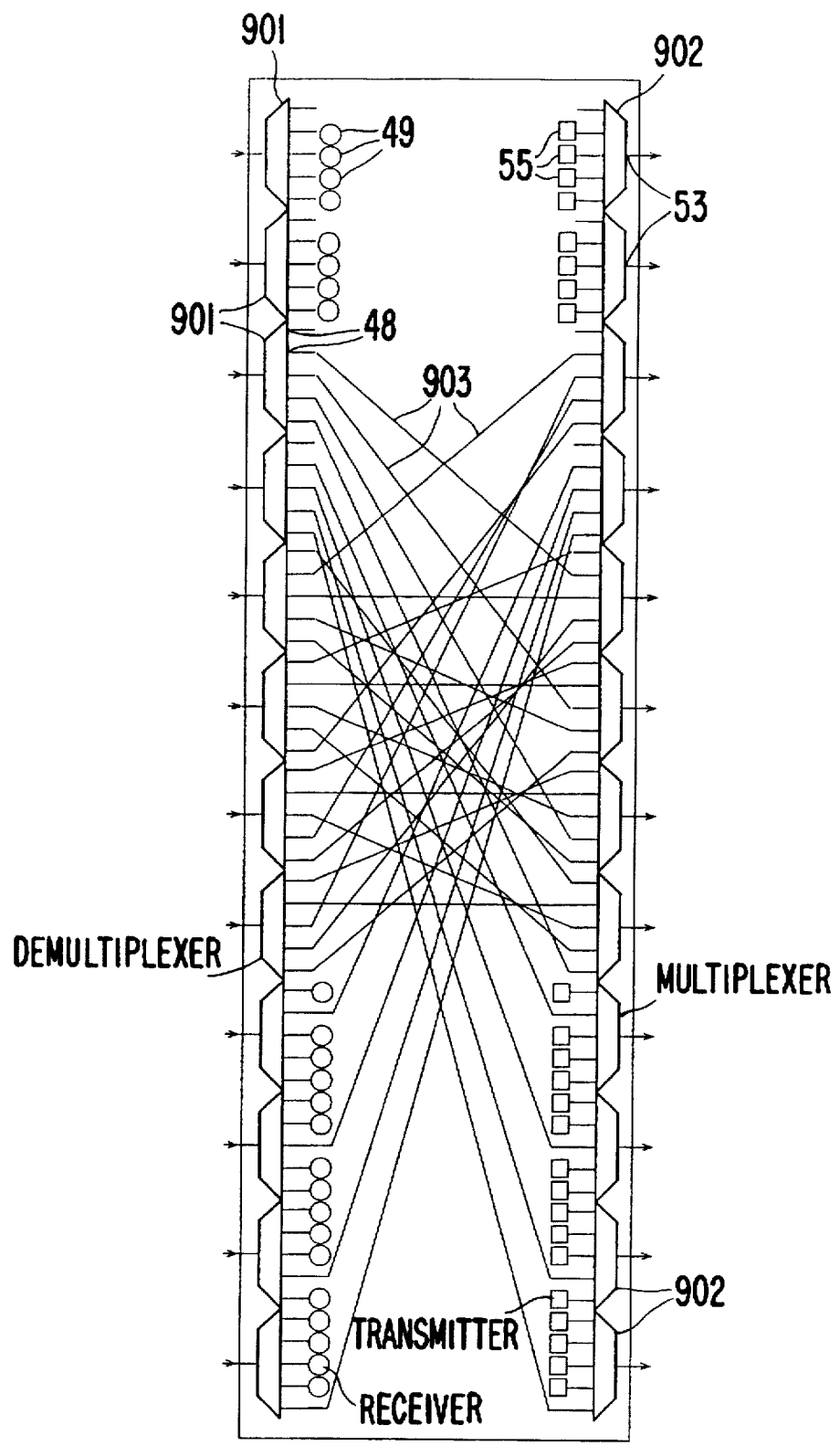
FIG. 11 shows the structure of one node of the expanded network according to FIG. 10 in a view similar to FIG. 9.

To explain the structure for all the nodes, which is also uniform for the expanded configuration of network 10, FIG. 11 shows the arrangement analogous to FIG. 9, expanded by four additional wavelength demultiplexers 901 and four additional wavelength multiplexers 902, to which are connected fibers 960 to 963, and fibers 970 to 973 (nodes according to FIG. 10a) or fibers 961, 962, 964, and 965 and fibers 970 to 973 (nodes according to FIG. 10b) or fibers 960 to 963 and fibers 971, 972, 974, and 975 (nodes according to FIG. 10c) or fibers 961, 962, 964, and 965 and fibers 961, 962, 964, and 965 (nodes according to FIG. 10d).

Starting with a network 10 with maximum utilization of the transmission capacity provided by the glass fiber connections, as shown in FIGS. 6 and 7, a problem of expandability can result, namely that no fibers and no transmission wavelengths are any longer available as addressing possibilities, with which nodes of network 10 would be addressable by the additional nodes by which network 10 was expanded, or would be addressable by the nodes of network 10 from the nodes by which network 10 was supposed to be expanded. This is particularly the case when the number of columns m and the number of lines n and hence the number of wavelengths used that are defined as different are identical and thus no single "free" address is any longer available in the address space covered. In this case, in other words when the supply of unused elements of the address space is completely exhausted, an expansion of the network is only possible when the transmission capacity provided by the glass fiber connections is not itself completely exhausted, in other words, the transmission bandwidth prepared for one or more of the signal paths is not yet completely utilized. This use of the capacity of one of the signal paths is determined exclusively by the choice of the transmission method, and in digital systems by the data transmission rate. The selection of the data transmission rate and the transmission method can be used in the designs of network 10 in which only the utilized wavelength and the utilized fiber are used for addressing, in other words, the signal path is a so-called "transparent" wavelength path, "bilaterally", in other words, separately for each individual transmitter-receiver pair. The division of a transmission capacity of such a wavelength path into various signal paths in order to permit access to the network from "outside" is only possible with an interface that uses either a frequency and/or a time and/or a code multiple access method and for this reason is provided both on the transmitter side and in the receiver on the wavelength path. If the access method works to divide the transmission capacity of the wavelength path in the electrical area, optoelectronic E/O, O/E converters are required for operation. If an expansion of the network is accomplished by such an increase in the addressing space, signal paths can consist of a plurality of partial paths that can be linked together only by means of the interfaces described. However, for these signal paths, the advantages of a "transparency" of the wavelength paths, namely on a transparent path, only the transmitter and receiver are chosen to match one another and must be synchronized with one another, i.e. no additional transmitting or carrying components along the path depend upon the choice of the transmission method and a data transmission rate, can no longer be used or can be used only partially. An expansion of the network is therefore advantageously provided in such fashion that the number of transparent wavelength paths from the nodes by which the network is expanded to the nodes of network 10 along which the data flows can be transported independently of one another, is made as large as possible. In the best case, the nodes by which the network is expanded fit completely into the functional transparent complete intermeshing of the network. A network 10 of the type described can be expanded, in other words meshed with a network or partial network with the same theoretical structure by transparent signal paths, in which either only the marginal or access nodes of the networks form the beginning and end points of the transparent paths, or a certain "penetration or intermeshing depth" is provided. A transparent intermeshing of two networks with one another in such fashion that only the degree of the marginal or access nodes, i.e. the number of fiber cables that are connected with a node, depends on the coupling of the networks, and a number of transparent wavelength paths is provided that is larger than the number of connections between these access nodes, has as necessary conditions that the addressing space of the networks is not fully utilized by the full intermeshing and capacity for locating these paths is still available. The power of the addressing spaces is always finite however, which rules out a full intermeshing of any number of nodes with one another.

Therefore the formation of signal paths from different transparent partial paths and the division of the transmission capacities using one of the multiple access methods mentioned above, cannot be ruled out in theory. In the following, with reference to FIGS. 12 and 13, another embodiment of a network 10 according to the invention will be explained, for which, without limitation of generality, it is assumed that it consists of a transparent fully intermeshed "core" 1000 with 3×3 nodes 1011 to 1013, 1021 to 1023, and 1031 to 1033, and of another eight nodes 1001 to 1008, by which this "core" 1000 has been expanded in the system shown. All the nodes of this network are linked into a lattice network by six optical fibers 1041 to 1046 and 1051 to 1056 pairwise along lines 1014, 1015, 1016, 1017, and 1018 and along columns 1024, 1025, 1026, and 1027. FIG. 13 shows an address table 1100 that can be used to read the wavelengths of any node from which the other nodes of the network can be addressed that, looking in any direction, are the closest or next to closest adjacent nodes of the (transmitting) node in question. The addressing takes place by analogy with the manner described in FIG. 8 where the address is encoded into one of five different wavelengths I to V as well as fibers 1041 to 1046 that are used to transmit the light flux affected by this wavelength. In contrast to the embodiment explained with reference to FIGS. 7 and 8, however, the addressing of the adjacent nodes from this transmitting node is always done according to a "practically fixed" address table that is the same for every node.

Figure 12:
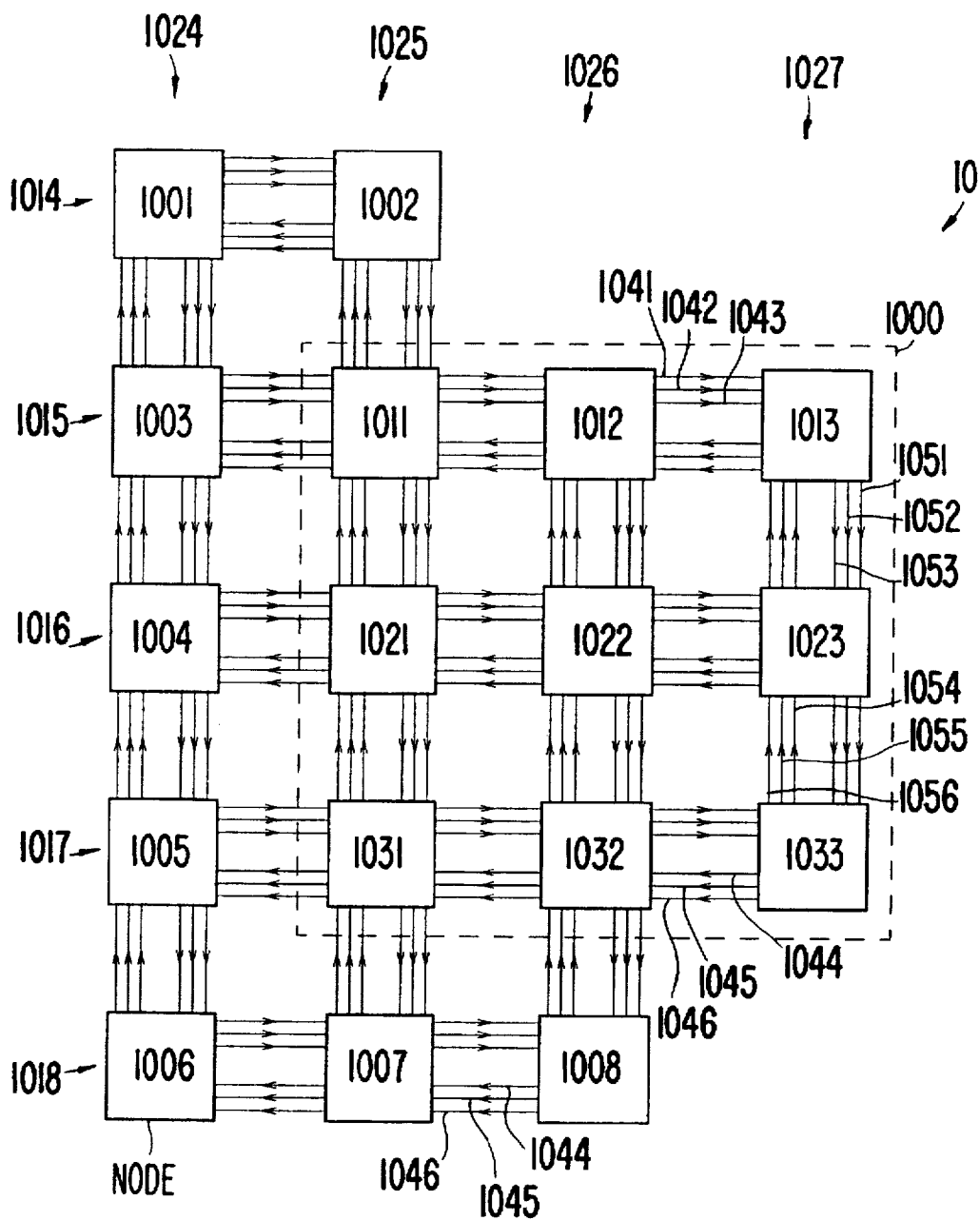
FIG. 12 is a transport network according to the invention whose number of nodes can be expanded to an infinite extent in the limiting case despite maximized utilization of the transmission capacity of the fibers used, in a schematically simplified block diagram.

The choice of wavelength is made on the basis of address table 1100 shown in FIG. 13. The choice of the fibers is very simple:

Fiber 1041 is used to address the "first right" adjacent column in FIG. 12, fiber 1042 is used to address the next to adjacent right-hand adjacent column, fiber 1044 is used to address the first left-hand adjacent column, and fiber 1045 is used to address the next to adjacent left-hand column. The allocation of the fibers along the columns is as follows:

Fiber 1051 carries the data fluxes of the "first upper" adjacent line, fiber 1052 carries that of the "second upper" adjacent line, fiber 1054 carries that of the "first lower" adjacent line, and fiber 1055 carries that of the "second lower" adjacent line to the receiving node in question.

of the fibers that are present within in a line or column, two fibers for example fibers 1043, 1046, 1053, and 1056 are provided for looping the data fluxes through.

In the general case where network 10 comprises at least m columns and n lines that are fully intermeshed transparently with one another, and m is selected to be equal to or greater than n without limitation of generality, (2·m−1) wavelengths defined as different and m·(m−1) optical fibers are provided pairwise along the lines and columns between the nodes. This produces an addressing space as well as a supply of unused transmission capacity that permit any desired expansion of the number of nodes that can communicate through a plurality of transparent wavelength paths with the expanded network so that as a result of the expansion, additional areas with a maximum of m×m nodes result that are fully intermeshed with one another. The embodiment shown in FIG. 12 comprises nodes 1011-1013, 1021-1023, 1031-1033 that are fully intermeshed with one another. It also comprises nodes 1001 to 1008 which are transparently intermeshed with nodes 1011-1013, 1021-1023, 1031-1033 that are fully intermeshed with one another, by fibers 1041-1046, that connect nodes 1003, 1004, and 1005 of column 1024 with nodes 1011, 1021, and 1031 of column 1025 and by fibers 1051 to 1056 that connect node 1002 of line 1014 with node 1011 of line 1015 and by the fibers that connect nodes 1007 and 1008 of line 1018 with nodes 1031 and 1032 of line 1017. This produces two additional "quadratic" transparently fully intermeshed partial networks of 3×3 nodes each, one of which comprises nodes 1003, 1011, 1012, and 1004, 1021, 1022 and 1005, 1031, and 1032, and the other comprises nodes 1004, 1021, 1022 and 1005, 1031, 1032, and 1006, 1007, and 1008.

We claim:

1. A transport network with a transmission capacity for telecommunications in which nodes of the network are transparently connected with one another by optical glass fiber lines functionally to produce a full intermeshing of nodes permitting simultaneous addressing of all the nodes by every other node of the network comprising:

(a) the nodes are coupled with one another in a matrix configuration in lines and columns;

(b) each of corner nodes has at least n connections in the column direction and at least m connections in the line direction:

(c) intermediate nodes (1,2 to 1,(m−1); n,2 to n,(m−1)) that are located in marginal lines, in a direction of the columns, have n connections and in a direction of the lines have 2·m connections, and the intermediate nodes (2,1 to (n−1),1 and 2,m to (n−1),m)) located in marginal columns, in a line direction, have m connections and, in a column direction, have 2·n connections;

(d) inner nodes of network are connected with each of four neighbors by a total of 2·m connections, in the line direction, and 2·n connections, in the column direction;

(e) individual nodes are addressable by at least one line and/or one column;

(f) a transmitting node addresses the received node first by sending out information through a fiber associated with a column of a receiver and secondly by a signal identifier associated with a line of a receiving node;

(g) the receiver identifies the line in which a transmitter is located from the optical fiber through which signal light flux is conducted to it and identifies a column of the transmitting node from the signal identifier of the received light flux; and (h) each node has (n·m−1) transmitters that are operable with the corresponding signal identifiers and (n·m−1) receivers each of which responds to one of the m different identifiers which are assigned to the nodes located in a line.

2. A network according to claim 1 wherein each node (n·m−1) has optical transmitters and receivers that are operable on different wavelengths, with addressing being encoded into the different wavelengths.

3. A network according to claim 2 wherein time slots are associated with each node in a periodic sequence, within which each node is addressable by signals transmitted by the other nodes.

4. A network according to claim 3 wherein an unambiguous combination of a wavelength and a time slot is utilized for addressing.

5. A network according to claims 4 wherein the combination of wavelengths and time slots for addressing, the time slots are used only for addressing within a column and the data streams from different columns within a node are brought together only by power-dividing elements.

6. A network according to claim 2 wherein in the event of a failure of a node (1,1 to n,m) or an optical glass fiber link between two nodes, multiple protection paths can be connected.

7. A network according to claim 6, wherein the multiple protection paths can be switched by means of an electronic control unit so that data fluxes that were determined to pass a part of the network that has dropped out, from a respective sending node, with aid of a multiplex method, are added to a data stream that is conducted to a network node of another line in order there again be added to another data stream by a multiplex method, said stream leading to the original destination nodes of a bypassed protected data stream.

8. A network according to claim 2 wherein the nodes have a uniform integratable structure which has as many wavelength multiplexers and wavelength demultiplexers as the optical fibers and waveguides that are connected to it, and waveguides conduct only light fluxes with one wavelength, that link the optical outputs of the wavelength demultiplexers with the optical inputs of the wavelength multiplexers.

9. A network according to claim 8 wherein light fluxes on the waveguides that link the wavelength demultiplexers and the wavelength multiplexers are reinforced with optical semiconductor amplifiers and are regenerated in their modulation pulse formation.

10. A network according to claim 1 wherein at least two additional optical fibers can be connected from nodes other than those in the network to at least one node of the network.

11. A network according to claim 10 wherein the network is operable with M different wavelengths in which wavelength multiplexers and wavelength demultiplexers of the network are operable with at least M+1 different wavelengths.

12. A network according to claim 11 wherein for all nodes in both the column and line directions each time, at least N·(N−1) connections are provided and the address of the line of each node is encoded into one of at least 2·N−1 different wavelengths defined for the nodes of the line, where N is the larger of the two numbers n and m.

13. A telecommunications network with a transmission capacity at nodes (1,1 to n,m) of the network are linked together transparently with one another by optical glass fiber lines functionally to produce a complete intermeshing of nodes (1,1 to n,m) that permits a simultaneous addressing of all the nodes (1,1 to n,m) by every other node in network comprising:

(a) nodes (1,1 to n,m) are coupled with one another in a matrix arrangement in lines and columns;

(b) each corner node (1,1; 1,m; n, 1, and n,m) has at least n connections in a column direction and has at least 2·m connections in a line direction:

(c) intermediate nodes located in marginal lines (1,2 to 1,(m−1) and n,2 to n,(m−1)) have at least n connections in the column direction and have at least 2 m connections in line direction, and the intermediate nodes located in the marginal columns (2,1 to (n−1),1 and 2,m to (n−1),m)) have at least m connections in a line direction and have at least 2·n connections in the column direction;

(d) inner nodes of the network are connected with each of four neighbors by a total of at least 2·m connections in the line direction and by at least 2·n connections in the column direction;

(e) individual nodes are addressable by at least one line and/or one column;

(f) a transmitting node addresses a receiving node first by emitting information through a fiber that is associated with a column of a receiver and second by a signal identifier that is associated with a line of the receiving node;

(g) the receiver identifies a line in which a transmitter is located on the optical fiber through which the signal light flux is conducted to the receiver and the column of the receiving node from the signal identifier of the received light flux;

(h) each node (n·m−1) has transmitters that are operable with corresponding signal identifiers and (n·m−1) receivers that respond to each of the m different identifiers that are associated with the nodes arranged in a line, characterized by the following features:

each of the corner nodes (1,1; 1,m; n,1 and n,m) has at least 2·(n−1) connections in the column direction and at least 2·(m−1) connections in the line direction;

the intermediate nodes (1,2; . . . ;1,j; . . . ;1,(m−1) and n,2; . . . ;n,j; . . . ; n,(m−1) with j=(2;3; . . . ; m−1)) located in marginal lines, have at least 2·(n−1) connections in the column direction and at least 2·(m−j)·j+2·(m−j+1)·(j−1) connections in a line direction, and the intermediate nodes located in the marginal columns (2,1; . . . ;i,1; . . . ;(m−1),1 and 2,m; . . . ; 1,j; . . . ; (n−1),m) with i=(2;3; . . . ; n−1)) have at least 2·(m−1) connections in the line direction and have at least 2·(n−i)·i+2·(n−i+1)·(i−1) connections in the column direction; and the inner nodes (i,j with i=(2;3; . . . ;n−1) and j=(2;3; . . . ; m−1)) of the network are connected with each four neighbors by a total of at least 2·(m−j)·j+2·(m−j+1)·(j−1) connections, in the line direction, and with at least 2·(n−i)·i+2·(n−i+1)·(i−1) connections, in the column direction.

14. A network according to claim 13 wherein an address of a line of each node is encoded into one of N different wavelengths and each node is addressable at one of the different N wavelengths for the nodes of a line, with N being the larger of the two numbers n and m.

15. A network according to claim 14 wherein an identical structure is provided for all nodes to which fibers are attached that carry light fluxes, that lead to a column of the node, and to which those fibers are connected that carry those light fluxes that are directed from the node outward to other columns of the network, and the other fibers are looped through.

16. A network according to claim 15 wherein independently of whether addressing of a controlled node from another node in the network takes place by a primary selection of the column and secondary selection of the line or by a primary selection of the line and secondary selection of the column of a target node, the target node is always addressable by the same wavelength.

17. A network according to claim 16 wherein:

(a) the nodes of columns j and j+1 are connected together pairwise with four additional fibers in the line direction, with j=(1,3,5,7, . . . , m−3,m−1) for even-numbered m and j=(1,3,5,7, . . . , m−4,m−2,m−1) for odd-numbered m; and (b) the nodes of line i and i+1 are connected together with four additional fibers pairwise in the column direction, where i=(1,3,5,7, . . . , n−3,n−1) for even-numbered m and i=(1,3,5,7, . . . , n4,n−2,n−1) for odd-numbered m.

18. A network according to claim 16, wherein time slots are assigned to the network in a period sequence within which the network is alternately switched to alternate signal path combinations.

19. A network according to claim 16, wherein at least two networks with an identified function and an identical transmission capacity but with different guidance of the signal paths are provided that are operable either alternately or jointly.

* * * * *